US 6,721,875 B1

(12) United States Patent
McCormick, Jr. et al.

(10) Patent No.: US 6,721,875 B1
(45) Date of Patent: Apr. 13, 2004

(54) METHOD AND APPARATUS FOR IMPLEMENTING A SINGLE-SYLLABLE IP-RELATIVE BRANCH INSTRUCTION AND A LONG IP-RELATIVE BRANCH INSTRUCTION IN A PROCESSOR WHICH FETCHES INSTRUCTIONS IN BUNDLE FORM

(75) Inventors: James E McCormick, Jr., Fort Collins, CO (US); Stephen R. Undy, Ft Collins, CO (US); Donald Charles Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/510,731

(22) Filed: Feb. 22, 2000

(51) Int. Cl.$^7$ .............................. G06F 15/00; G06F 9/00
(52) U.S. Cl. ........................ 712/233; 712/24; 712/210
(58) Field of Search .......................... 712/32, 233, 24, 712/210, 230

(56) References Cited

U.S. PATENT DOCUMENTS

| | | | | |
|---|---|---|---|---|
| 4,530,050 A | * | 7/1985 | Fukunaga et al. | 712/32 |
| 4,794,517 A | * | 12/1988 | Jones et al. | 712/32 |
| 4,935,867 A | * | 6/1990 | Wang et al. | 711/217 |
| 5,515,518 A | * | 5/1996 | Stiles et al. | 712/239 |
| 5,590,358 A | * | 12/1996 | Mizrahi-Shalom et al. | 712/24 |
| 5,761,470 A | * | 6/1998 | Yoshida | 712/210 |
| 5,822,575 A | * | 10/1998 | Tran | 712/239 |
| 5,859,999 A | | 1/1999 | Morris et al. | 395/565 |
| 5,860,017 A | | 1/1999 | Sharangpani et al. | 395/800.23 |
| 5,922,065 A | | 7/1999 | Hull et al. | 712/24 |
| 6,202,144 B1 | * | 3/2001 | Ben-Ephraim et al. | 712/238 |
| 6,237,077 B1 | * | 5/2001 | Sharangpani et al. | 712/24 |
| 6,253,305 B1 | * | 6/2001 | Matsuzaki et al. | 712/204 |

OTHER PUBLICATIONS

Mississippi College, CSC 110—Computer Mathematics, Dec. 1998, http://www.mc.edu/courses/csc/110/module3_2.html.*

Internet Publication "The Alpha 21264 Microprocessor: Out–Of–Order Execution at 600 Mhz" by R.E. Kessler, Aug. 1998, pp. 1–30.
"Patents shed light on Merced" by Alexander Wolfe, Electronic Engineering Times, Feb. 15, 1999, pp. 43 and 44.
"Trading Conflict and Capacity Aliasing in Conditional Branch Predictors" by Michaud, et al., Proceedings of the 24th Annual International Symposium on Computer Architecture, 1997, 9 pages.
"Alternative Implementations of Two–Level Adaptive Branch Prediction", by Tse–Yu Yeh, et al., Department of Electrical Engineering and Computer Science, University of Michigan, Jul. 1992, pp. 124–134.
"Intel's IA–64 Application Developer's Architecture Guide" (Rev 1.0, Order No. 245188–001, May 1999).
"Fine–Grained Dynamic Instrumentation of Commodity Operating System Kernels" by Tamches, et al., Computer Sciences Department, University of Wisconsin (7 pages 2–sided).
"The Paradyn Parallel Performance Measurement Tools" by Miller, et al., Computer Sciences Department University of Wisconsin, pp. 1–23.
"Instrumentation and Optimization of Win32/Intel Executables Using Etch", by Romer et al., University of Washington, 8 pages.

* cited by examiner

Primary Examiner—Eddie Chan
Assistant Examiner—David J. Huisman

(57) ABSTRACT

Disclosed is a computer architecture with single-syllable IP-relative branch instructions and long IP-relative branch instructions (IP=instruction pointer). The architecture fetches instructions in multi-syllable, bundle form. Single-syllable IP-relative branch instructions occupy a single syllable in an instruction bundle, and long IP-relative branch instructions occupy two syllables in an instruction bundle. The additional syllable of the long branch carries with it additional IP-relative offset bits, which when merged with offset bits carried in a core branch syllable provide a much greater offset than is carried by a single-syllable branch alone. Thus, the long branch provides for greater reach within an address space. Use of the long branch to patch IA-64 architecture instruction bundles is also disclosed. Such a patch provides the reach of an indirect branch with the overhead of a single-syllable IP-relative branch.

13 Claims, 13 Drawing Sheets

| SYLLABLE_2 | SYLLABLE_1 | SYLLABLE_0 | TEMPLATE BITS |
|---|---|---|---|
| 41 | 41 | 41 | 5 |

100

400

| ARCHITECTURE | INSTRUCTION | RANGE |
|---|---|---|
| PA RISC 2.0 | B | PC ± 256 KB |
| | BLL | PC ± 8 MB |
| Sparc v9 | BA.a | PC ± 8 MB |
| | Jump | reg ± 16 KB |
| PowerPC | B | PC ± 32 MB |
| MIPS IV | J | 256 MB aligned region |
| | B<cond> | PC ± 128 KB |
| Alpha | Branch | PC ± 4 MB |
| | Jmp | register ± 16 KB |
| IA-64 v2.4 | BR target | PC ± 16 MB |

FIG. 7

| ORIGINAL BUNDLE | PATCHED BUNDLE | TARGET BUNDLE(S) |
| --- | --- | --- |
| MII (m1-i1-i2) | MIB (m1-i1-B) | MII (nop-i1-i2) |
| MI,I (m1-i1, i2) | MIB (m1-i1-B) | MI,I (nop-i1, i2) |
| MLI (m1-LI) | MIB (m1-nop-B) | MLI (nop-LI) |
| MMI (m1-m2-i1) | MMB (m1-m2-B) | MMI (nop-m2-i1) |
| M,MI (m1, m2-i1) | MBB (m1-B1-B2) | MII (m2-nop-nop) <br> MII (nop-i1-nop) |
| MFI (m1-f1-i1) | MFB (m1-f1-B) | MIB (nop-i1-nop) |
| MMF (m1-m2-f1) | MMB (m1-m2-B) | MFI (nop-f1-nop) |
| MIB (m1-i1-b1) | MIB (m1-i1-B) | MIB (nop-nop-b1) |
| MBB (m1-b1-b2) | MBB (m1-b1-B) | MIB (nop-nop-b2) |
| BBB (b1-b2-b3) | BBB (b1-b2-B) | MIB (nop-nop-b3) |
| MMB (m1-m2-b1) | MMB (m1-m2-B) | MIB (nop-nop-b1) |
| MFB (m1-f1-b1) | MFB (m1-f1-B) | MIB (nop-nop-b1) |

FIG. 16

| ORIGINAL BUNDLE | PATCHED BUNDLE | TARGET BUNDLE |
|---|---|---|
| MII (m1-i1-i2) | MLB (m1-LB) | MII (nop-i1-i2) |
| MI,I (m1-i1, i2) | MLB (m1-LB) | MI,I (nop-i1, i2) |
| MLI (m1-LI) | MLB (m1-LB) | MLI (nop-LI) |
| MMI (m1-m2-i1) | MLB (m1-LB) | MMI (nop-m2-i1) |
| M,MI (m1, m2-i1) | MLB (m1-LB) | MMI (nop-m2-i1) |
| MFI (m1-f1-i1) | MLB (m1-LB) | MFI (nop-f1-i1) |
| MMF (m1-m2-f1) | MLB (m1-LB) | MMF (nop-m2-f1) |
| MIB (m1-i1-b1) | MLB (m1-LB) | MIB (nop-i1-b1) |
| MBB (m1-b1-b2) | MLB (m1-LB) | MBB (nop-b1-b2) |
| BBB (b1-b2-b3) | MLB (m1-LB) | BBB (b1-b2-b3) |
| MMB (m1-m2-b1) | MLB (m1-LB) | MMB (nop-m2-b1) |
| MFB (m1-f1-b1) | MLB (m1-LB) | MFB (nop-f1-b1) |

METHOD AND APPARATUS FOR IMPLEMENTING A SINGLE-SYLLABLE IP-RELATIVE BRANCH INSTRUCTION AND A LONG IP-RELATIVE BRANCH INSTRUCTION IN A PROCESSOR WHICH FETCHES INSTRUCTIONS IN BUNDLE FORM

FIELD OF THE INVENTION

The invention pertains to branch instructions which are executed by a processor, and more specifically, to increasing the reach of IP-relative branch instructions which are executed by a processor (IP=instruction pointer, also known as a program counter, or PC).

BACKGROUND OF THE INVENTION

Insufficient branch reach (also known as "span" or "range") is a common weakness of RISC (reduced instruction set computer) architectures. For example, see FIG. 7, which provides a list of the branch instructions used in various RISC architectures, and the range of each of these branch instructions.

As server/workstation applications move to 64-bit architectures, it is believed that problems associated with insufficient branch reach will need to be addressed more and more frequently.

One 64-bit architecture is the Intel®/Hewlett-Packard® IA-64 architecture. A discussion of this architecture can be found in Intel's "IA-64 Application Developer's Architecture Guide" (Rev 1.0, Order Number 245188-001, May 1999), which is hereby incorporated by reference for all that it discloses.

IA-64 architecture provides two general types of branch instructions: the IP-relative branch and the indirect branch. An IP-relative branch instruction carries with it a signed, 20-bit offset. The target of an IP-relative branch instruction is determined by adding the instruction's offset to the value of an instruction pointer. Since IA-64's instruction pointer is 64-bits long, an IP-relative branch instruction cannot redirect the instruction pointer to any address within a 64-bit address space. Rather, an IP-relative branch instruction can only redirect the instruction pointer to addresses within ±16 MB. While from a static code generation point of view, a ±16 MB reach seems sufficient to reach anywhere in a compiled and linked module, in the context of dynamic code generation, dynamic linking, or dynamic optimization, a branch instruction with greater reach is called for in order to reach all the different pieces of code.

An indirect branch instruction is advantageous over an IP-relative branch instruction in that an indirect branch instruction can redirect an instruction pointer to any address within a 64-bit address space. However, there are drawbacks to frequent and/or dynamic use of indirect branching.

One drawback is that the execution of an indirect branch instruction must be preceded by a somewhat lengthy setup routine in which a 64-bit target is fetched into a general register and then moved into one of eight branch registers (or calculated, looked up, etc., and then moved to a branch register). Only then may the indirect branch instruction be executed. The execution of an indirect branch therefore requires the execution of an instruction sequence such as: MOVL, MOV_to_br, and BR.

Due to the speculative nature in which high performance processors fetch instructions, it is desirable to move an indirect branch target into one of the eight branch registers early, so as to insure the availability of the target when branch prediction hardware needs to rely on the accuracy of the target for branch prediction. By insuring the availability of the target for branch prediction purposes, the fetch of instructions from an incorrect code section can be avoided, and as a result, the flush of incorrectly fetched instructions from an instruction pipeline, as well as the injection of bubbles (or gaps) into the pipeline, can be avoided. Unfortunately, it is sometimes difficult to move an indirect branch target into a branch register at an early date. This is because the IA-64 architecture provides only eight branch registers. If a target is moved into one of these branch registers too early, it is possible that it will be overwritten prior to when it is needed. At the same time, there is a risk that any move of a target into a branch register will result in the overwrite of some other needed target.

An indirect branch's lengthy setup routine also creates problems for tools such as dynamic instrumentation and optimization tools. As will be explained below, each of these tools needs to "patch" compiled and linked program code with branches to new and/or optimized "patch code". Patch code is simply an address space which is used for the storage of, for example, dynamic instrumentation and/or optimization routines. Patching involves either the static or dynamic insertion of branches to patch code in already compiled and linked program code. Each time a patch is made, an instruction which is replaced by a branch to patch code needs to be written into the patch code so that it eventually gets executed.

The patching of IA-64 program code with indirect branch code sequences is especially difficult since 1) IA-64 program code comprises instructions which are encoded in bundles of three instructions each, and 2) an indirect branch code sequence does not fit within a single instruction bundle. Since the instructions of an indirect branch sequence do not fit within a single instruction bundle, the patch of an indirect branch sequence (e.g., MOVL, MOV-to-br, and BR) into already compiled and linked binary program code requires two or more instruction bundles to be overwritten. However, once program code has been compiled and linked, information on which instruction bundles in the program code are the possible targets of branch instructions is not always known. If a branch instruction branches to an instruction bundle which has been replaced with part of a patch sequence, or if a branch instruction branches to an instruction bundle which falls between the bundles of a patch sequence, an exception could result for two reasons. First, it is likely that the patch sequence would not execute correctly, and second, if the patch sequence does not execute correctly, instructions which were copied out of the original program code to make way for the patch sequence bundles will never be executed. Patching with indirect branch sequences is also problematic in that such a sequence requires the use of available general and branch registers. A patching tool is unlikely to know the locations of such registers (if any even exist). Patching with indirect branch sequences is therefore an unsafe practice.

Caveats relating to the patching of multiple instruction bundles are further discussed in the article "Fine-Grained Dynamic Instrumentation of Commodity Operating System Kernels" by A. Tamches and B. Miller (CS Dept. of the University of Wisconsin-Madison, July 1998).

Two alternatives to patching with indirect branches exist. Each alternative involves the patching of only a single instruction bundle with a replacement instruction bundle incorporating an IP-relative branch to a "hole" in binary program code. A hole in binary program code is nothing more than a number of consecutively addressed memory locations which reside within the bounds of memory locations which store the binary program code.

The difference between the two alternatives is that the first alternative uses larger holes to store "patch code" (or portions thereof, whereas the second alternative uses smaller holes (known as springboards) for the insertion of "trampoline code". Trampoline code is merely code that helps enable one to branch outside of the confines of more or less contiguous binary program code when the range of an IP-relative branch is not great enough to perform such a branch.

Since compiled and linked program code typically comprises few and randomly placed holes, single instruction bundle patching typically requires that holes be inserted into an executable at predetermined locations by a compiler/linker. Since the compiler/linker will not know which portions of an executable will be patched by dynamic instrumentation and/or optimization tools, the compiler/linker needs to insure that inserted holes can be reached from any instruction bundle in program code. Since an IA-64 IP-relative branch has a ±16 MB reach, holes must appear after approximately every 32 MB of IA-64 program code. Thus, a branch residing in a patched instruction bundle in the middle of a 32 MB chunk of program code (e.g., a dynamic instrumentation or optimization starting point) would be just able to reach a hole.

The first alternative to patching with indirect branch sequences is illustrated in FIG. 8. In this alternative, holes 802, 804, 806 are used to directly store patch code 808, 810. One advantage of this approach is that a branch from program code 812, 814 to patch code 808, 810 requires the execution of just a single IP-relative branch instruction. However, since the execution of patch code 808, 810 might result in a patch code exit being too distant from a patched bundle to return to the bundle (or the bundle which is sequentially after it), an indirect branch sequence may still be needed to enable a return to program code 800 from patch code 808, 810. Once again, the execution of an indirect branch sequence is problematic in that it requires the use of available general and branch registers which may not exist. Furthermore, hole allocation is not very efficient since patch points may not be uniformly distributed within program code 800. For example, when patch points are clustered, some holes 802, 804 may become too small to accommodate all of the patch code sections 808, 810 which they need to handle, while other holes 806 may be under utilized (or never used at all).

A second and more efficient alternative is to allocate smaller holes 902, 904, 906 for the sole purpose of holding trampoline code 908, 910 which jumps to a contiguous code cache 912, as illustrated in FIG. 9. Since trampoline code requires only a few instructions (i.e., an indirect branch routine 908, 910), reserved holes 902–906 can be quite small. In addition, patch code 912 can be stored in a more or less contiguous code section, rather than here and there in reserved holes 902–906. This provides for patch code 912 being branched to from multiple patch points. However, the problems associated with having to execute an indirect branch sequence 908, 910 still remain. Also, while trampoline code may consist of nothing more than an indirect branch code sequence 908, 910 which jumps to patch code 912, the limited reach of IP-relative branches in IA-64 architecture (±16 MB) still requires the insertion of holes 902–906 in program code 900 at about the same frequency (i.e., about every 32 MB).

Reserving holes in binary program code for either of the above patch methods is not trivial. For example, the reservation of holes in load modules is difficult to enforce. Independent Software Vendors may not agree to leave holes in their binaries. It would also be difficult to enforce hole reservation as a default linking strategy. In addition, it would be difficult to control all of the system tools which are available for a platform such as IA-64. Hence, some tools may not enforce hole reservation.

Absent a strict and uniform hole reservation policy, the above approaches to increasing branch range are very difficult to implement.

As briefly discussed already, a problem with all of the above patch methods is that an IA-64 indirect branch sequence needs access to at least one free general register and one free branch register. At run-time, identifying these two available registers is a challenge. However, there are several possible fixes. First, a compiler could annotate which registers are available during the execution of each procedure in program code. The problem with this is that registers may not be available. Second, a compiler could reserve a couple of general, branch, and predicate registers for the sole use of run-time instrumentation/optimization tools. This however, like hole reservation, is inefficient since registers may be reserved but not used. Third, a run-time tool could analyze a patch point to determine which registers are available. The problem with this fix is that such an analysis is costly, especially when the typical purpose of instrumentation and optimization tools is to streamline execution. Furthermore, it is quite possible that no registers will be found, either because there are no free registers, or because the analysis tool does not have enough information to determine which registers are free. Fourth, a run-time tool could spill a couple of registers. However, register spilling is rather expensive on IA-64 since the UNAT register must be spilled first. Also, a spill cannot be performed unless the location of at least one free register is already known. Each potential "fix" for making registers available to a patching tool therefore has a downside. In addition, it is unlikely that any of the above fixes would actually be used.

A need for a branch with long reach and low overhead therefore exists.

SUMMARY OF THE INVENTION

In accordance with the above need, the invention comprises a new branch instruction, and methods and apparatus for using same. The new branch instruction provides for greater branch reach than was heretofore possible. The new branch instruction, as well as the methods and apparatus which use it, operate under the assumption that a processor fetches instructions which are encoded in bundle form.

In one embodiment of the invention, a processor is provided with increased branch reach as follows. First, it is determined which of a number of instruction bundle templates corresponds to a fetched instruction bundle. If the fetched instruction bundle corresponds to an instruction bundle template which indicates that multiple syllables of the fetched instruction bundle hold a long IP-relative branch instruction, a target of the long IP-relative branch instruction is calculated. A long IP-relative branch instruction is one in which a first syllable of the long IP-relative branch instruction carries N offset bits, and a second syllable of the long IP-relative branch instruction carries P offset bits. The target of a long IP-relative branch is calculated by adding an instruction pointer value to an addend which is formed at least in part from the N and P offset bits which are carried by the syllables of the long IP-relative branch instruction. After calculation of the target, program flow control may be diverted to an instruction bundle addressed by the target.

A processor which is capable of carrying out the above method may generally comprise a register file having a plurality of registers, an instruction set, and a plurality of execution units. The instruction set includes instructions which address the registers, wherein each instruction is one of a plurality of instruction types. Each of the plurality of execution units is one of a plurality of types, and each instruction type is, by definition, allowed to be executed on one or more of the execution unit types. As previously stated, it is assumed that all processors discussed herein fetch instructions which are encoded in bundle form. For example, each instruction bundle may include a plurality of instructions which are grouped together in an X bit field. Instructions are located in instruction syllables of the X bit field. The instruction types include integer, memory, floating-point and branch instructions. The branch instructions comprise a single-syllable IP-relative branch instruction (i.e., an IP-relative branch instruction which is contained within a single syllable of an instruction bundle) and a long IP-relative branch instruction. The single-syllable IP-relative branch instruction carries with it M offset bits (i.e., bits which, when added to the value of an instruction pointer, yield a target of the branch instruction). The long IP-relative branch instruction occupies multiple syllables of an instruction bundle, in which a first syllable carries N offset bits, and a second syllable carries P offset bits.

Another embodiment of the invention further assumes 1) that compiled and linked program code comprises instructions which are grouped into bundles, and 2) that the instructions of each bundle are sequentially ordered. In accordance with these assumptions, a method of patching the aforesaid compiled and linked program code may generally comprise forming a patch bundle and one or more patch code bundles. The patch bundle is then used to overwrite a bundle which already exists in the compiled and linked program code (i.e., the bundle to be patched). At or about the same time, the one or more patch code bundles are written into patch code. The patch bundle and one or more patch code bundles are formed by 1) writing a long IP-relative branch instruction into multiple syllables of the patch bundle, 2) copying into syllables of the patch bundle, which syllables precede the long IP-relative branch instruction, instructions which are similarly located in the bundle to be patched, and 3) copying other instructions of the bundle to be patched into ones of the one or more patch code bundles. The long IP-relative branch instruction provides a means of branching to patch code.

The use of a long IP-relative branch instruction in the above embodiments of the invention poses several advantages. One advantage is that a long IP-relative branch instruction (hereinafter referred to as just a "long branch") has a farther reach than most other types of branches. By assigning appropriate numbers to N and P, the N and P offset bits carried in a long branch's instruction syllables can be merged to supply a very large offset, and even one which is capable of redirecting the value of an instruction pointer to the address of any instruction in an address space. For example, a 64-bit processor can typically access a 64-bit address space. If instructions and data are retrieved from this address space in 16 byte chunks which are 16-byte aligned (i.e., 128 bits at a time), then the least significant four bits of the IP are always zero, and the addition of a 60-bit offset to the current value of an instruction pointer would redirect the instruction pointer to any other 16-byte chunk within the 64-bit address space. Thus, if the value of the instruction pointer coincided with the address of a first sequentially addressed byte in the 64-bit address space, the execution of a single long branch instruction with N=39 and P=21 can redirect the value of the instruction pointer to coincide with the address of any byte in the 64-bit address space, including the address of a last sequentially addressed byte in the 64-bit address space.

Another advantage of a long branch is that it achieves the reach of an indirect branch without requiring the availability of a general or branch register, and does so with the execution of only a single instruction.

Yet another advantage of a long branch is that it is very easy to implement in a processor which is already designed to handle single-syllable IP-relative branches. Part of the reason for this is that these processors already need to add single-syllable IP-relative branch offsets to the value of an instruction pointer. For example, if a 64-bit processor already needs to add a 20-bit signed offset to a 64-bit instruction pointer value, it will already include, at a minimum, a 20-bit adder with sign extension capability out to 64-bits. To convert such a structure to a full 64-bit adder is relatively simple and requires little extra chip area. The only significant cost is the need to route extra addend bits to the adder. However, if the processor comprises a plurality of branch execution units that are more or less adjacent to one another, it is likely that bits which are routed to one or more of the branch execution units will be routed over one or more of the other branch execution units. If this is the case, little extra wiring is required to drop these bits into one of the branch execution units over which they already pass, and then multiplex them with sign extension data which is needed for the unit's processing of a single-syllable IP-relative branch instruction.

Yet another advantage of a long branch is that it can be inserted into an instruction bundle template which, at least in IA-64 architecture, can be used to patch any other instruction bundle template. This is significant since tools such as dynamic instrumentation and optimization tools often need to patch compiled and linked program code. Heretofore, these tools have not been able to patch program code using a single instruction bundle, and still branch to anywhere within an address space. For example, in IA-64 architecture, program code could be patched with a bundle comprising a single-syllable IP-relative branch to patch code, which single-syllable IP-relative branch only provided a ±16 MB reach, or program code could be patched using the multiple instruction bundles which are required to set up and execute an indirect branch. As will be discussed in the following Description, each of these existing branch types poses problems for dynamic instrumentation and optimization tools.

These and other important advantages and objectives of the invention will be further explained in, or will become apparent from, the accompanying description, drawings and claims.

BRIEF DESCRIPTION OF THE DRAWINGS

Illustrative and presently preferred embodiments of the invention are illustrated in the drawings in which:

FIG. 7 provides a list of branch instructions used in various RISC architectures, and the range of each of the branch instructions;

FIG. 16 illustrates how various IA-64 instruction templates may be patched using a single-syllable IP-relative branch instruction;

DESCRIPTION OF THE PREFERRED EMBODIMENT

Outline:
IA-64 Software Architecture
Long IP-Relative Branch
Micro-Architecture for Supporting Long Branch
    Prediction and Execution
        1. An Integrated Low Level Instruction/Branch Prediction Cache
            A. The L0I
            B. The L0IBR
        2. Higher Level Caches
            A. The L1 Cache
            B. The L1B
        3. New Branch Prediction Structures
        4. Branch Retirement Queue
        5. Instruction Pointer Generator
        6. Long Branch Specific Hardware Requirements Overall Structure/Operation of Micro-Architecture Alternatives
Applications Which Benefit From a Long IP-Relative Branch Instruction
    1. Stub Reduction
    2. Dynamic Instrumentation
    3. Post-Link Time Optimizers
Instruction Bundle Patching
    1. How to Patch a Bundle
    2. Patching a Bundle With a Single-Syllable IP-Relative Branch Instruction
    3. Patching a Bundle With a Long IP-Relative Branch Instruction A preferred embodiment of a long IP-relative branch instruction is implemented as an improvement to the Intel®/Hewlett-Packard® IA-64 architecture. A more detailed summary of this architecture is therefore set forth in the first part of this Description. Those skilled in the art will readily understand how a long IP-relative branch instruction, as well as various of the methods and apparatus described herein which use same, might be adapted for use in other architectures.

IA-64 Architecture

Figures 1, 4:
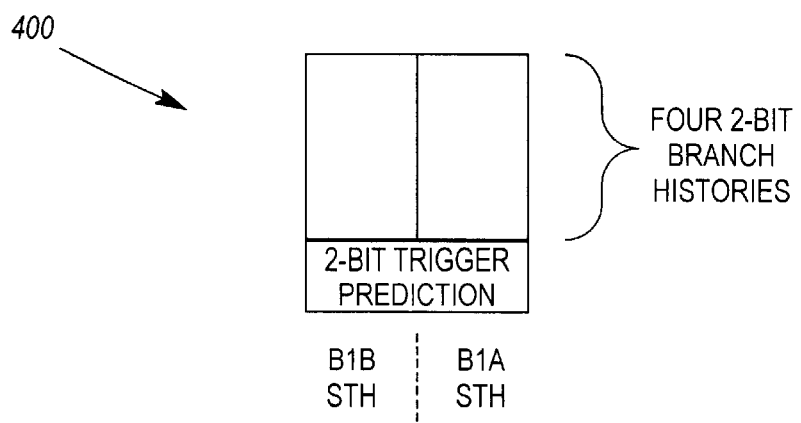
FIG. 1 illustrates an IA-64 instruction bundle.
FIG. 4 illustrates the storage of branch histories and trigger prediction information in an encoded form.

In IA-64, instructions are fetched in bundles. Each bundle 100 comprises three 41-bit instruction syllables (or slots) and a 5-bit template field, for a total of 128 bits. An exemplary IA-64 instruction bundle 100 comprising syllables 0, 1 and 2, is illustrated in FIG. 1.

The instructions of an instruction bundle 100 are executed sequentially (syllable_0 first, then syllable_1, then syllable_2), unless and until an "unconditional" or "taken" branch instruction transfers program flow control to the first sequential instruction of a different instruction bundle (or until a fault, trap, interrupt or some other event causes a transfer of program flow control). So long as program flow control is not altered, execution of the instructions in one bundle 100 is followed by the execution of instructions in a next sequential bundle.

There are five IA-64 instruction syllable types (M, I, F, B, and L), six IA-64 instruction types (M, I, A, F, B, and L), and 12 basic template types (MII, MI,I, MLX, MMI, M,MI, MFI, MMF, MIB, MBB, BBB, MMB, MFB). An instruction template type specifies the mapping of instruction syllables to execution unit types, as well as the location of "stops". Each basic template type has two versions: one with a stop after the third syllable, and one without. A stop indicates that one or more instructions after the stop may have certain kinds of resource dependencies with respect to one or more instructions before the stop (i.e., a stop enables explicit specification of parallelism). Note that the MI,I and M,MI instruction templates, by definition, have mid-bundle stops (denoted by the commas in these templates). Instructions must be placed in syllables corresponding to their instruction types, and based on a template specification, except for A-type instructions, which can be placed in either I or M syllables. For example, a template specification of MII means that of the three instructions in a bundle 100, the first instruction is a memory (M) or A-type instruction, and the next two instructions are integer (I) or A-type instructions.

The MLX template is a unique template in that it really only holds two instructions, a memory (M) instruction and a long X-type instruction. Currently, an X instruction can only be an integer instruction, and the MLX template is therefore, in reality, an MLI template. The X syllable of the MLX template holds an integer instruction which carries with it twenty-two bits of a "long immediate" value, which twenty-two bits are routed to an integer unit along with forty-one additional bits of the "long immediate" which are held by the L syllable of the MLX template. An LX instruction is therefore a form of integer instruction.

The flow of instruction execution in an IA-64 processor is controlled by an instruction pointer. The instruction pointer (IP) holds the address of the bundle 100 which contains the currently executing IA-64 instruction. The IP is incremented as instruction bundles 100 are executed, and can be set to a new value through execution of a branch instruction (or by other means). Because IA-64 instruction bundles 100 are 16 bytes, and are 16-byte aligned, the least significant four bits of the IP are always zero.

As previously discussed, IA-64 software architecture provides for two basic categories of branches: IP-relative branches and indirect branches. An IP-relative branch specifies a branch target address with a signed 20-bit offset, which offset is carried with the IP-relative branch instruction. This offset, when added to the starting address of the instruction bundle containing the IP-relative branch, provides the starting address of a target bundle. The signed 20-bit offset (i.e., 21-bit offset) allows an IP-relative branch to reach ±16 MB. In some parts of this description, the IP-relative branch instruction which is currently provided by IA-64 architecture is referred to as a "single-syllable IP-relative branch instruction".

An indirect branch provides greater reach than is provided by an IP-relative branch, but at a somewhat higher cost. The target bundle of an indirect branch is specified by a value held in one of eight 64-bit branch registers. An indirect branch target therefore needs to be moved into one of the eight branch registers prior to when it is needed (which is prior to when branch prediction hardware relies on the target for the purpose of branch prediction). An indirect branch therefore requires a setup routine such as: MOVL, MOV-to-BR, BR. The MOVL instruction moves a 64-bit value into a general register (GR). The MOV-to-BR instruction then moves the 64-bit general register value to a specified branch register (BR). The BR instruction then executes a branch to a target address which is stored in a specified branch register.

Since the setup routine for an indirect branch involves three instructions, some of which require 64-bit values to be moved, the instructions of an indirect branch's setup routine can at best fit into two instruction bundles. Furthermore, since the three instructions are dependent upon one another, and therefore must be executed sequentially, the execution of an indirect branch takes at least three cycles (as compared to an IP-relative branch, which requires the execution of only a single instruction). Also, the execution of an indirect branch requires the use of at least one available general register and one available branch register. An indirect branch therefore requires a lot of overhead. However, an indirect branch is advantageous over an IP-relative branch in that it can branch to anywhere within IA-64's 64-bit address space.

Figure 10:
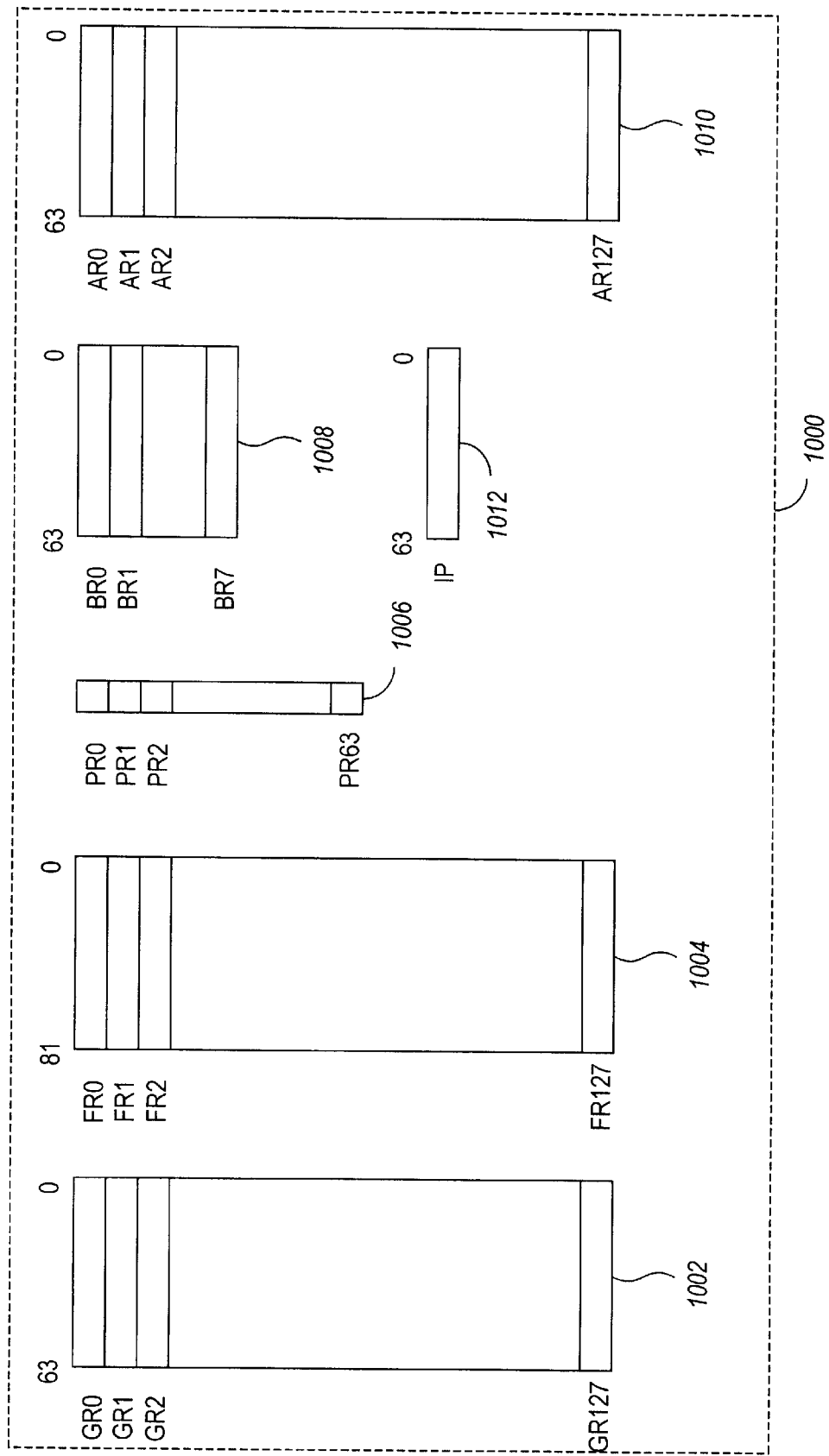
FIG. 10 illustrates an IA-64 register model.

The general 1002 and branch 1008 registers which are referred to in the preceding paragraphs are part of IA-64's architected register set 1000. A model of these 1002, 1008 and other IA-64 registers 1004, 1006, 1010, 1012 is illustrated in FIG. 10. Note that the registers of an IA-64 register model additionally comprise a plurality of floating-point registers 1004, a plurality of predicate registers 1006, a plurality of application registers 1010, and an instruction pointer register 1012 (as well as other registers). IA-64 registers are discussed in greater detail in Intel's "IA-64 Application Developer's Architecture Guide", supra.

A branch can be conditional or unconditional. An unconditional branch is always taken. A conditional branch can be taken or not taken. The outcome of a conditional branch must therefore be predicted in some way. One way in which the outcome of a branch can be predicted is via compiler generated "hints". These hints are encoded with a branch instruction at compile time and are then decoded by a processor prior to when the branch instruction is executed.

Following is a description of a proposed improvement to the IA-64 instruction set, the improvement being the addition of a long IP-relative branch instruction.

Long IP-Relative Branch

A long IP-relative branch can be implemented by adding a new instruction template to the IA-64 set of instruction templates. This new template is referred to herein as an MLB template, and is a class of MLX template wherein a fairly typical IP-relative branch instruction is stored in the B syllable of the template, and additional offset bits corresponding to the IP-relative branch are stored in the L syllable of the template. More specifically, the B syllable of the template holds the core of a long IP-relative branch instruction, including an IP-relative branch's usual 20-bit signed offset. The L syllable then carries an additional thirty-nine offset bits. As a result, a long IP-relative branch instruction is capable of carrying with it a 59-bit signed offset (i.e., a 60-bit offset). When instruction bundles comprise 16 bytes, and are 16-byte aligned, the addition of 60 offset bits to the value of an instruction pointer enables a redirection of the instruction pointer to any bundle address within a 64-bit address space.

Long branch formats corresponding to the conditional branch (cond) and conditional procedure call (call) formats of the existing single-syllable IP-relative branch are currently proposed. However other formats of long branch could also be implemented, as will be understood by one skilled in the art. Call and conditional formats of the long branch might look like:

| (qp) | brl.cond.bwh.ph.dh target$_{64}$ | |
|---|---|---|
| (qp) | brl.call.bwh.ph.dh b$_1$ = target$_{64}$ | call form |
| | brl.ph.dh target$_{64}$ | pseudo-op |

In the above notations, abbreviations stand for the following: qp=qualifying predicate; brl=long branch; bwh=whether prediction hint; ph=prefetch hint; and dh=deallocation hint. The target, operand, in assembly, is a label which specifies a target to branch to. This is encoded in the long branch instruction as an immediate offset (imm$_{60}$) between the target bundle and the bundle containing this instruction (imm$_{60}$=target$_{64}$-IP>>4). As previously stated, the L syllable of a bundle carries 39 bits of offset information, with the remaining signed 20 bits (i.e., 21 bits) being carried by the B syllable as in any other IA-64 IP-relative branch instruction.

There is also a pseudo-op for long unconditional branches which is encoded like a conditional branch (btype=cond), with the qp field specifying PR 0, and with the bwh hint of sptk.

The branch type determines how the branch condition is calculated and whether the branch has other effects (such as writing a branch register). For all long branch types, the branch condition is simply the value of the specified predicate register. For conditional branches, if the qualifying predicate is 1, the branch is taken. Otherwise it is not taken. For call-type branches, if the qualifying predicate is 1, the branch is taken and the following actions occur:

The current values of the Current Frame Marker (CFM), the EC application register and the current privilege level are saved in the Previous Function State application register.

The caller's stack frame is effectively saved and the callee is provided with a frame containing only the caller's output region.

The rotation rename base registers in the CFM are reset to 0.

A return link value is placed in BR b1.

Read after Write (RAW) and Write after Read (WAR) dependency requirements for long branch instructions are the same as they are for single-syllable branch instructions. Furthermore, the values for various branch hint completers are the same as for single-syllable branch instructions.

The $target_{64}$ value is formed by adding the value of an instruction pointer (IP) to an addend formed, in part, from the offset bits carried by the L and B syllables of a long branch. For IA-64, the equation for calculating $target_{64}$ can be as follows:

$$target_{64}=IP+((i<<59|imm_{39}<<20|imm_{20b})<<4),$$

where i is the sign bit and $imm_{20b}$ is the 20-bit offset, which together form the signed 20-bit offset already carried by a single-syllable branch instruction, and where $imm_{39}$ is the 39 additional offset bits carried by the L syllable of a long branch, and where "4" is the number of low order bits which represent the fact that IA-64 architecture fetches instruction bundles with a granularity of 16 bytes.

The core branch syllable of a long IP-relative branch instruction preferably looks just like a single-syllable IP-relative branch instruction, but for a difference in a single opcode bit which distinguishes one from another.

Micro-Architecture for Supporting Long Branch Prediction and Execution

Figure 2:
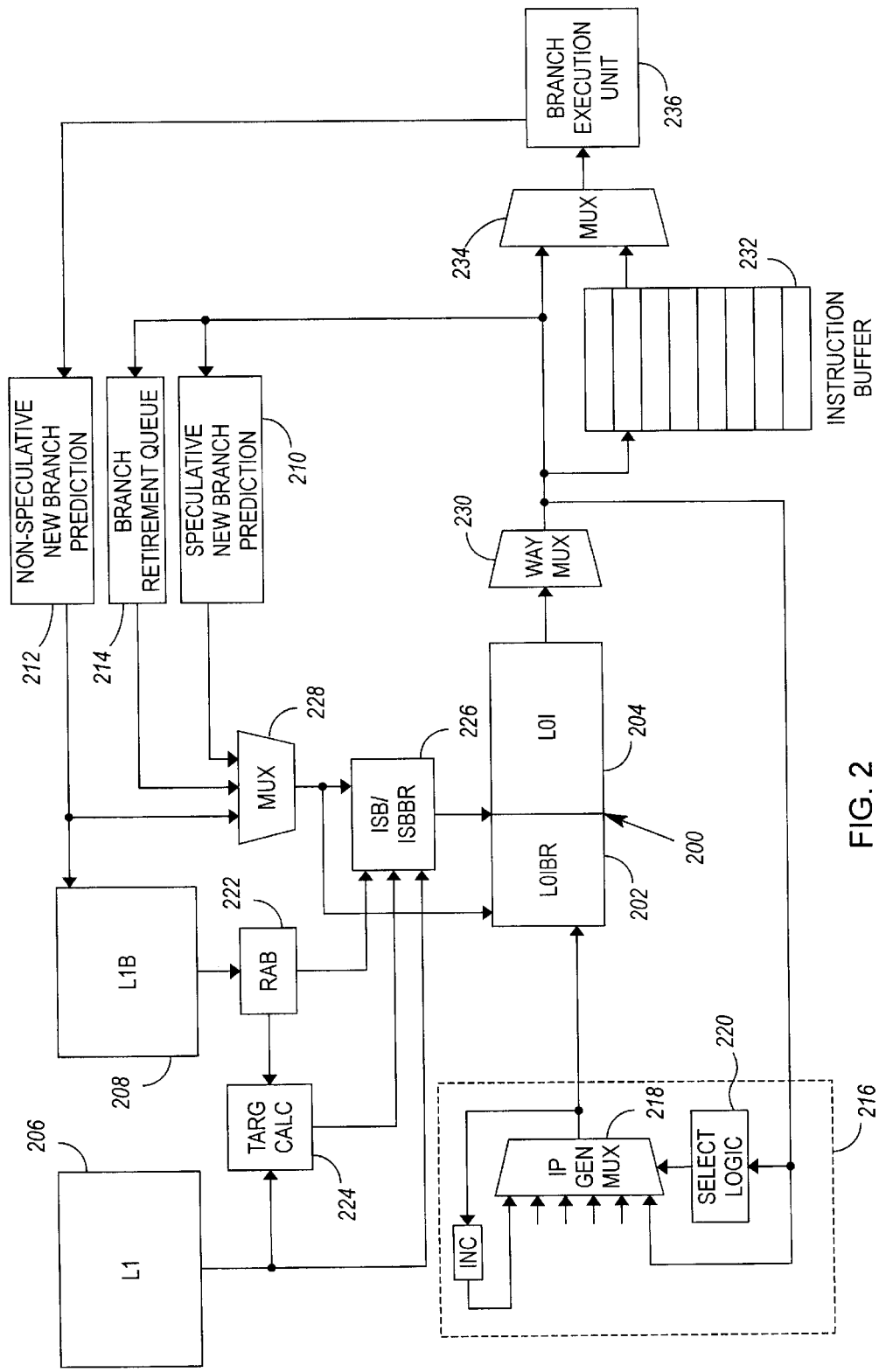
FIG. 2 illustrates various components of a processor, including a multi-level prediction information memory hierarchy and an integrated low level instruction/branch prediction cache.

FIG. 2 illustrates a variety of structures for supporting the prediction of a long branch within a processor. The structures comprise, among others, an integrated low level instruction/branch prediction cache 200 (sometimes referred to herein as simply an "integrated low level cache"), distinct higher level instruction 206 and branch prediction 208 caches, and structures which assist in the update of branch prediction information which is stored in the various caches.

One should note that long branch instructions handled by the following micro-architecture are predicted in the same way that other branch instructions are predicted.

1. An Integrated Low Level Instruction/Branch Prediction Cache A structure which is central to the FIG. 2 apparatus is the integrated low level instruction/branch prediction cache 200. Although functionally operating as a single structure, this integrated low level cache 200 conceptually comprises a low level instruction cache 204 (the L0I) and a low level branch prediction cache 202 (the L0IBR). See also FIG. 3.

In the past, most processors have maintained branch prediction information in a cache which is functionally distinct from a processor's low level instruction cache 204. Part of the reason for this is that branch prediction algorithms which have been used in the past have largely relied on global branch prediction. Global branch prediction is a form of branch prediction in which each retired branch instruction shifts a bit which is indicative of its outcome (either taken or not taken) into a global branch history register. This global branch history register is then used to index a cache of 2-bit counters which stores prediction histories for the various patterns which the bits of the global branch history register can assume. Each time a retired branch updates the global branch history register, it also updates an appropriate pattern history counter. See, e.g., Yeh & Patt, supra.

The accuracy of a global branch predictor depends heavily on the size of the global history register. There are two reasons for this. First, longer global histories have more information for distinguishing between different prediction scenarios. Second, a longer global history register means a larger table of 2-bit pattern history counters, and thus less counter aliasing. Although global branch predictors can provide a very high level of accuracy when the right ratio of computer program branches to global history register size (and pattern history table size) is maintained, local branch predictors are advantageous for several reasons. For example, as will be described in greater detail later in this description, local branch predictors allow information which predicts a "next fetch outcome" of a branch instruction to be determined at the time of a branch's current fetch (where the information which predicts the next fetch outcome of a branch instruction comprises trigger information for predicting whether the branch instruction will be taken or not taken, and if the branch is predicted to be taken, target information which predicts where the taken branch will be taken to).

Another advantage of local branch prediction is that it scales better for programs comprising a large number of branches. In other words, as the number of branches in a computer program increases, a point is reached where global branch prediction requires more chip area to achieve the same prediction accuracy which is achieved by local branch prediction. Since the IA-64 software architecture is specifically designed for the efficient handling of large computer programs (and thus, programs comprising a relatively greater number of branch instructions), local branch prediction is believed to be a better choice for implementing such an architecture.

Since local branch prediction provides for determining at the time of a branch's current fetch, information which predicts a next fetch outcome of the branch, it makes sense to store information which predicts a branch instruction's next fetch outcome in a cache 202 which is integrated with the cache 204 holding the branch instruction itself. By doing so, the prediction information can simply be looked up and used the next time the branch instruction is fetched. This saves time over having to wait to access a global branch history register and its associated pattern history table after a branch is fetched, and then having to access (or even calculate) a branch target. FIG. 2 illustrates such an integrated low level instruction and branch prediction cache 200.

While one or more caches which collectively function as a branch prediction cache can also be used to store information which predicts a branch's next fetch outcome, there are many advantages to using the integrated low level cache 200 illustrated in FIG. 2. First, local branch prediction requires a more or less one-to-one correspondence between branch instructions and branch prediction information (since branch prediction information is maintained on a per branch basis). While one way to establish such a correspondence is to increase the sizes of one or more stand-alone branch prediction caches, it was decided that a better way to do this was to introduce an integrated low level instruction/branch prediction cache 200.

A low level instruction cache 204 uses complete tagging (i.e., tags which are large enough to uniquely identify the instructions stored therein). The cost of storing these complete tags is significant, and a cache management structure which is able to efficiently handle complete tags is costly to design, test and build. To store branch prediction information on a true per branch basis would be equally as costly. However, the integration of a low level instruction cache 204 and branch prediction cache 202 under a common management structure 300 (FIG. 3) allows one to take advantage of economies of scale. Branch instructions and their corresponding prediction information can be retrieved from an integrated low level cache 200 using a single addressing means.

Furthermore, in order to allow full-speed operation of a processor's instruction pipelines, the access speed of a branch prediction cache 202 necessarily has to be roughly equivalent to that of a processor's low level instruction cache 204. The integration of a branch prediction cache 202 with a low level instruction cache 204 insures such a speed equivalency.

A branch prediction cache could alternatively be implemented using one or more caches which collectively function as a branch prediction cache. However, to implement complete tagging in such a cache(s) would be expensive. Additionally, hardware would be needed to "associate" branch prediction information with the branch instructions to which it corresponds. The cost of implementing a branch prediction cache could be reduced, for example, by using less than complete tagging in the cache. However, this would introduce an uncertainty as to whether information fetched from the branch prediction cache truly corresponds to a branch instruction fetched from a low level instruction cache 204. By integrating low level instruction 204 and branch prediction 202 caches, prediction information correspondence is known to be accurate.

Since not all instructions stored in a low level instruction cache 204 are branch instructions, it necessarily follows that at any given instant, a lot of entries in the branch prediction portion 202 of an integrated low level instruction/branch prediction cache 200 will not be used. However, the advantages of 1) being able to leverage the management structure of a low level instruction cache 204, and 2) always having prediction information ready and available when a branch is fetched, are believed to far outweigh the relatively low density of useful prediction information which might be stored in such a cache 202.

A. The LOI

Figure 3:
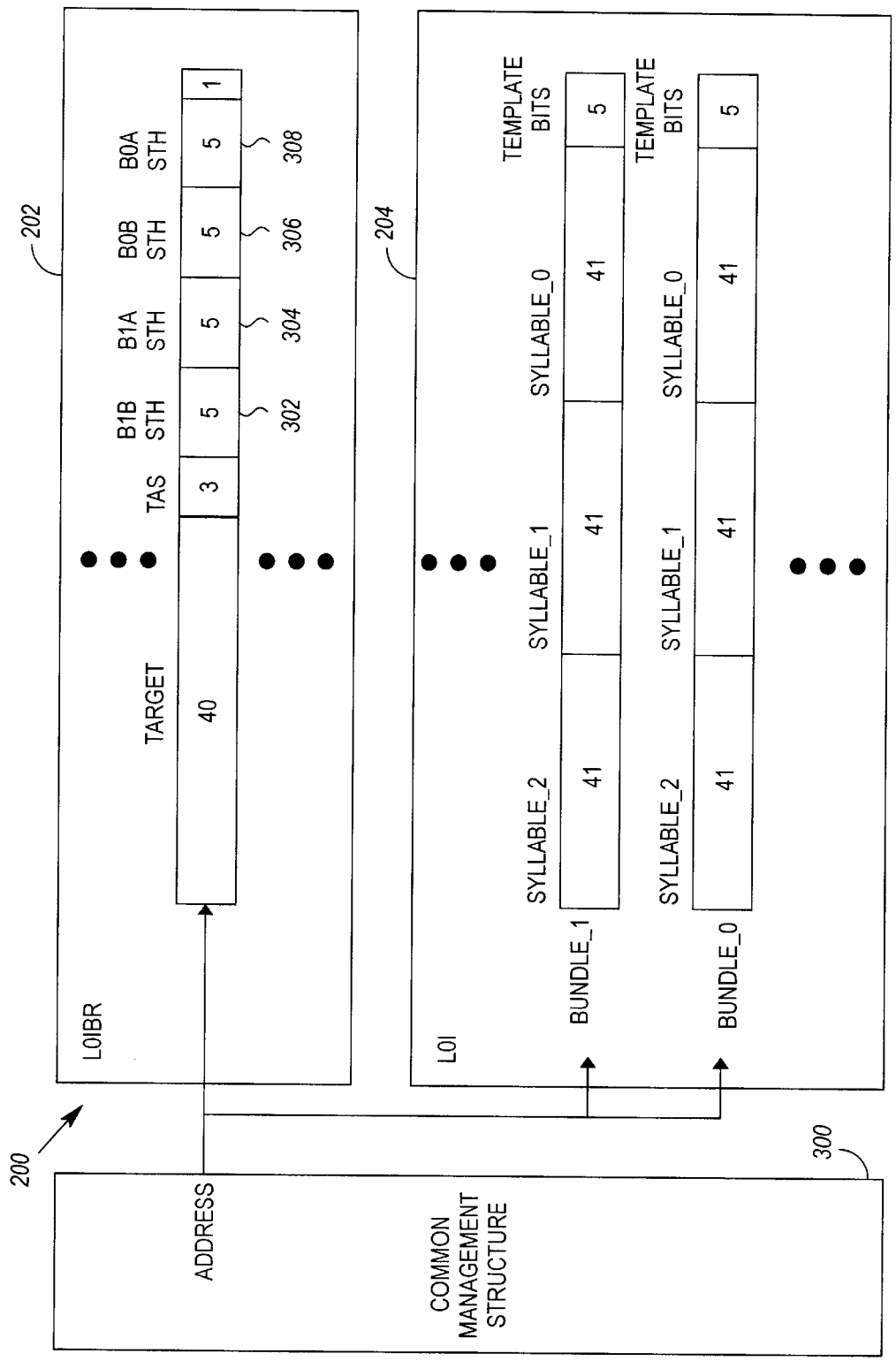
FIG. 3 illustrates a preferred embodiment of the integrated low level cache in the FIG. 2 memory hierarchy.

In a preferred embodiment of the LOI portion 204 of the integrated low level cache 200, instructions are stored in the LOI 204 in bundle pairs. A bundle pair of instructions comprises two instruction bundles, each of which in turn comprises three instruction syllables and a number of template bits. An exemplary instruction bundle pair which might be stored in the LOI 204 is illustrated in FIG. 3 (BUNDLE__0 and BUNDLE__). The three syllables of each instruction bundle are designed to be executed in order, with syllable__0 being executed first, then syllable__1, and finally syllable__2 (assuming, that is, that an earlier executed branch instruction does not cause program flow control to be transferred to the start of a different instruction bundle). Although program flow control can transfer to the start of either instruction bundle in an instruction bundle pair, when program flow control is transferred to the first sequential bundle of a pair, instruction execution proceeds from the first bundle to the second bundle in an ordered fashion (again, assuming that an earlier executed branch instruction does not cause program flow control to be transferred to the start of a different instruction bundle).

One reason that instructions are preferably stored in the LOI 204 in bundle pair form is to amortize the cost of a fairly large number of address bits which are used to access the LOI 204, over an even larger number of instruction bits.

B. The LOIBR

In a preferred embodiment of the LOIBR portion 202 of the integrated low level cache 200, branch prediction information is stored for each bundle pair of instructions stored in the LOI 204. One form that the LOIBR branch prediction information can assume is illustrated in FIG. 3. The prediction information comprises a number of bits of a predicted target, target correlation data (TAS), and four branch history and trigger prediction chunks 302, 304, 306, 308. The branch history and trigger prediction chunks 302308 are hereinafter referred to as single-way trigger/history (STH) chunks.

Each of the four STH chunks 302–308 stored in the LOIBR 202 comprises four branch history bits and a trigger prediction bit. The trigger prediction bit predicts whether a branch which is currently stored in the LOI 204 will be taken or not taken at its next fetch. The branch history bits which are stored with a given trigger prediction bit form a record of past taken/not taken outcomes of the branch whose outcome the trigger prediction bit predicts.

Since an instruction bundle 100 is capable of holding up to three branch instructions, it is therefore possible for an instruction bundle to have more branches than there are available STH chunks 302–308 for the bundle 100. STH chunks 302–308 are therefore used in the following manner. When syllable__0 of an instruction bundle 100 does not hold a branch instruction, a distinct STH chunk 302, 304 is allotted for each of the instruction bundle's two remaining syllables. When syllable__0 of an instruction bundle 100 does hold a branch instruction, a pair of STH chunks 302, 304 are used to store branch history and trigger prediction information in an encoded form 400 (FIG. 4). When used to store encoded information, two STH chunks 400 can store branch history and trigger prediction information for all three of an instruction bundle's syllables. Note that the current state of IA-64 architecture only provides one template in which syllable__0 of an instruction bundle can hold a branch. This template is BBB. As a result, anytime syllable__0 of an instruction bundle 100 holds a branch, it is possible (although not guaranteed) that all three of the instruction syllables in the bundle 100 will hold a branch. To streamline the decision as to whether encoded STH chunks 400 should be used, encoded STH chunks 400 are preferably used anytime syllable__0 of an instruction bundle 100 holds a true branch, regardless of whether syllables 1 and 2 actually do hold branch instructions.

FIG. 4 illustrates an encoded pair of STH chunks 400. Note that the encoded pair 400 holds four 2-bit history events and a single 2-bit trigger prediction for its corresponding instruction bundle. A value of "00" for the 2-bit trigger prediction indicates that none of an instruction bundle's branches are predicted to be taken; a value of "01" for the 2-bit trigger prediction indicates that a branch in syllable__2 is predicted to be taken; a value of "10" for the 2-bit trigger prediction indicates that a branch in syllable__1 is predicted to be taken; and a value of "11" for the 2-bit trigger prediction indicates that a branch in syllable__0 is predicted to be taken.

Given current IA-64 instruction templates, the two LOIBR STH chunks 300, 302 which are allotted for an instruction bundle 100 stored in the LOI 204 can be used in one of three ways. First, if an instruction bundle 100 holds only one branch instruction, and the branch instruction does not appear in syllable_0, one STH chunk 300 will store branch history and trigger prediction information for the branch. Second, if an instruction bundle 100 holds two branch instructions, and neither of these branch instructions appears in syllable_0, two STH chunks 302, 304 will be used to individually store branch history and trigger prediction information for the two branches. Third, if an instruction bundle 100 holds a branch instruction in syllable_0, two STH chunks 302, 304 will be used to store encoded branch history and trigger prediction information 400 for the instruction's branches. Note that in the encoded case, two STH chunks 400 can handle branch history and trigger prediction information for up to three branches. However, an encoding of two STH chunks 400 does not necessarily mean that an instruction bundle 100 has three branches.

As will be described later in this description, unused L0IBR STH chunks 302–308 can sometimes be used to store L1B management information.

Each instruction bundle pair stored in the L0I 204 maps to a single branch target (or portion thereof) stored in the L0IBR 202. A target therefore maps to the first sequentially executed branch instruction of an instruction bundle having a predicted taken branch, which instruction bundle is the first bundle following a "bundle pair entry point". Since IA-64 software architecture dictates that program flow control can be directed to the start of any instruction bundle 100, a branch instruction may redirect program flow control to either the first (BUNDLE_0) or second (BUNDLE_1) instruction bundle of a bundle pair. It is therefore assumed that when program flow control is directed (or redirected) to one bundle of a bundle pair during a current fetch of the bundle pair, program flow control will be directed to the same bundle at the next fetch of the bundle pair. The point to which program flow control is directed is referred to herein as a bundle pair entry point. Once a bundle pair entry point has been determined, the first predicted taken branch may be determined by assessing the trigger prediction bits corresponding to the instruction bundle pair and then determining which branch instruction of the instruction bundle pair is the first branch instruction after the bundle pair entry point to denote a predicted taken branch.

The target correlation bits which are stored with a target merely map the target to the syllable or branch instruction of an instruction bundle pair for which the target was generated (or mark the target invalid).

One may calculate from the above description that for each instruction bundle pair (256 bits) stored in the L0I portion 204 of the integrated low level cache 200, 63 bits of data are stored in the L0IBR portion 202 of the cache 200 (the L0IBR 202 actually provides 64-bits of storage per instruction bundle pair, one bit of which is currently unused). However, this is only a preferred construction of the L0IBR 202, and the number of bits stored therein can be increased or decreased depending on such factors as the number of target bits which it is desired to store for a given application, the number of history bits per branch which it is desired to store, the number of STH chunks 302–308 per instruction bundle 100 (or bundle pair) which are provided, etc.

2. Higher Level Caches

Note that many instructions which are stored in the integrated low level cache 200 will be non-branch instructions. Corresponding prediction information entries for these instructions will therefore not be used. This is tolerated in order to achieve quick access and economies of scale when storing/accessing prediction information which will be needed by a processor in the immediate future. Prediction information can be fetched from the L0IBR 202 at the same time that corresponding instructions are fetched from the L0I 204, and there is no need to pull this information together from two separate cache structures. However, the FIG. 2 apparatus does not include an integrated higher level instruction and branch prediction cache—in part due to the fact that higher level cache structures are typically much larger and slower than lower level cache structures, and a prediction information portion of a higher level integrated structure would contain too many blank entries (i.e., wasted space). Instead, larger quantities of some of the branch prediction information stored in the L0IBR 202 are stored in a distinct higher level branch prediction cache—the L1B 208. The standalone nature of the L1B 208 enables it to store branch prediction information at a higher density than what is stored in the L0IBR 202.

A. The L1 Cache

A second structure which is disclosed as part of the FIG. 2 apparatus is a second level instruction cache (i.e., the L1 cache 206). The L1 cache 206 is a higher level cache with respect to the low level integrated cache 200, and is designed to store a greater number of instructions than can be stored in the L0I portion 204 of the low level integrated cache 200. Some of the instructions stored in the L1 cache 206 will be copies of instructions which have been loaded into the L0I, and other instructions stored in the L1 206 may be copies of instructions which have yet to be loaded into the L0I 204 (or copies of instructions which have been overwritten in the L0I 204). However, while the L1 cache 206 stores copies of instructions which have been loaded into the L0I 204, the L1 206 preferably does not store copies of the branch prediction information values which have been loaded into the L0IBR 202 (the L1B 208 does this to some extent). Nor does the L1 cache 206 usually store each and every instruction which exists in the L0I 204.

Although the L1 206 preferably does not store copies of the branch prediction information values which have been loaded into the L0IBR 202, the L1 cache 206 preferably stores some branch prediction information. For example, branch prediction hints which are generated by a compiler or the like are often encoded as part of the branch instructions which they hint. As a result, a preferred embodiment of the L1 cache 206 continues to store these hints. However, as will be shown below, there are advantages to storing backup copies of more extensive branch prediction information (such as branch histories) in a cache 208 which is separate from the L1 cache 206. In this manner, a second level branch prediction cache 208 can be formatted and managed differently from the L1 cache 206, and in a manner which is better optimized for the storage of branch prediction information.

B. The L1B

A third structure which is disclosed as part of the FIG. 2 apparatus is a second level branch prediction cache (i.e., the L1B cache 208). The L1B cache 208 is to the L0IBR 202 as the L1 cache 206 is to the L0I 204. The L1B 208 is therefore a higher level cache with respect to the L0IBR 202, and as a result, will typically be larger and somewhat slower than the L0IBR 202.

A preferred embodiment of relevant portions of the L1B cache 208 is described and illustrated in the copending application of James E. McCormick, Jr. entitled "Non-Tagged Prediction Cache" (HP Docket No. 10990035-1). Also note that the preferred embodiment of the L1B 208 is only capable of storing, at most, two of the four L0IBR STH chunks 302–208 which correspond to a particular instruction bundle pair stored in the L0I 204. Thus, the remainder of the branch prediction information which is maintained by the L0IBR 202 is not maintained by the L1B 208. However, one skilled in the art will realize that more, less and/or different types of branch prediction information could be stored in the L1B 208, depending on the needs of a particular application.

With respect to branch history and trigger prediction information, the L1B 208 stores a much larger volume of information than can be stored in the L0IBR 202. Thus, if an instruction bundle pair and its corresponding branch prediction information is deleted from the low level integrated cache 200, branch history and trigger prediction information corresponding to an instruction bundle pair fetched from the L1 cache 206 will hopefully reside in the L1B cache 208. If it does, the low level integrated cache 200 can be largely filled with data fetched from the L1 206 and L1B 208 caches.

As was previously mentioned, the L1B 208 preferably only stores two of the four L0IBR STH chunks 302–308 which correspond to an L0I instruction bundle pair. As a result, a preferred embodiment of the FIG. 2 apparatus only uses the L1B 208 to store L0IBR STH chunks 302–308 when only two STH chunks are used by an instruction bundle pair. Thus, the L1B 208 is used 1) when each instruction bundle of a bundle pair holds a single branch instruction, 2) when one instruction bundle of a bundle pair holds two branch instructions, and the other instruction bundle holds none, and 3) when one instruction bundle of a bundle pair holds three branch instructions (or is presumed to hold up to three branch instructions due to a branch existing in syllable_0 of the instruction bundle), and the other instruction bundle holds none. Note that in the last case, branch history and trigger prediction information for the three branch instructions will be encoded in only two STH chunks 400. In all other cases, the L1B 208 is not used as a backup to the L0IBR 202. Fortunately, the arrangement of branches in an instruction bundle pair usually falls into one of the above three enumerated cases. One skilled in the art will realize that the L1B 208 could be made large enough to store much more L0IBR information if available chip area so permitted.

The preferred relationship between the L0IBR 202 and L1B 208 is generally a write-through relationship. In other words, when branch history and trigger prediction bits are updated in the L0IBR 202, the same bits are written into the L1B 208. However, a preferred arrangement of the L0IBR 202 and L1B 208 incorporates a number of exceptions to this general write-through policy. First, since the L1B 208 only provides storage space for two STH chunks 302, 304 per instruction bundle pair, STH chunks 302, 304 are only written to the L1B 208 when an instruction bundle pair utilizes no more than two STH chunks 302, 304. However, since most instruction bundle pairs hold no more than two branch instructions, this first exception to the general write-through policy has been found to degrade branch prediction performance only minimally.

Another exception to the general write-through relationship between the L0IBR 202 and L1B 208 is that a branch instruction might be prevented from using the L1B 208. For example, one state of the ".clr" hint of the IA-64 software architecture might be used to instruct the FIG. 2 apparatus not to use the L1B 208 for a particular branch instruction. In this manner, a compiler could decide not to use the L1B 208 in predicting certain branch instructions (e.g., certain well-behaved branches which it knows can be predicted just as well using compiler generated hints).

A third exception to the general write-through relationship between the L0IBR 202 and L1B 208 is that an STH chunk 302 is only written to the L1B 208 when the STH chunk 302 is believed to provide information which yields better prediction accuracy than could be achieved if the L0IBR 202 were merely initialized to some default value (e.g., by an initializer which drives all history and trigger prediction bits to logic zeros, or vice versa; perhaps based on the compiler hints which are encoded with a branch instruction). This second exception to the general write-through relationship between the L0IBR 202 and L1B 208 is explained in greater detail in the following paragraphs.

There are many possible ways to initialize an STH chunk 302 in the L0IBR 202. One way to perform such an initialization is to retrieve relevant data from the L1B 208. However, many factors could lead to needed STH chunks 302–308 not being in the L1B 208. For example, 1) if the L1B 208 is smaller than the L1 206, 2) if instruction bundles have been fetched into the L1 cache 206, but have yet to be loaded into the L0I 204 for the first time, 3) if not all data stored in the L0IBR 202 is copied into the L1B 208, or 4) if instruction hints indicate that the L1B 208 should not be used or relied on, there will be times when the L1B 208 does not hold a value (or values) corresponding to an instruction bundle pair which is being fetched from the L1 cache 206.

If the L1B 208 does not contain a needed value, then some other means for initializing the L0IBR 202 must exist. One preferred method of initializing an L0IBR STH chunk 302 after encountering an L1B miss is to fill all of the bits of the STH chunk 302 with logic zeros (or alternatively, with logic ones). As a result, the probability of correctly predicting a branch outcome is relatively lower the first time the branch is encountered. However, prediction accuracy increases after the branch has been executed one or more times. As one skilled in the art will appreciate, the hardware which is required to initialize an STH chunk 302 with logic zeros is relatively simple and low-cost to implement.

Another way to initialize an STH chunk 302 after encountering an L1B miss is to fill all of the bits of the chunk 302 with either logic zeros or logic ones, depending on the values assumed by prediction hints which are encoded in the branch instruction (e.g., static or dynamic compiler hints). A variation of this initialization scheme which has provided faster L0IBR initialization is to 1) assume that a branch will not be taken, 2) fill the branch's corresponding STH chunk 302 with all logic zeros, and 3) incur a one cycle penalty to refill the STH chunk 302 with all logic ones if hint information indicates that a fill with logic ones would provide a more accurate branch prediction.

It was previously stated that an L0IBR STH chunk 302 is only written to the L1B 208 when the chunk 302 is believed to hold information which yields better prediction accuracy than could be provided if the L0IBR 202 were merely initialized to some default value. Assuming that an STH chunk 302 is initialized to all logic zeros after encountering an L1B miss, a write of these zeros into the L1B 208 serves no real purpose since a re-initialization of the L0IBR 202 without reference to the L1B 208 would provide the same data. Furthermore, the failure to write L0IBR initialization zeros into the L1B 208 offers significant advantages. The most significant of these advantages is that failing to write L0IBR initialization zeros into the L1B 208 allows the L1B 208 to effectively store a larger quantity of substantive prediction information.

For example, if the L1B 208 is constructed as a non-tagged, n-way cache which stores data using redundancy and index hashing, the writing of a new data value into the L1B 208 has a tendency of overwriting duplicate copies of other data values. In other words, if duplicate copies of data A, data B and data C have already been written into different sets of indexed storage locations in the L1B 208, the write of data D into the L1B could overwrite, in a worst case scenario, one of the duplicate copies of data A, one of the duplicate copies of data B, and one of the duplicate copies of data C. As one can appreciate, if such overwriting occurs with too great a frequency, a time will come when data A, data B and data C no longer exist in the L1B 208. One way to reduce the chance that data A, data B and data C will be overwritten is to avoid writing L0IBR initialization zeros to the L1B 208. If these zeros are written into the L1B 208, and the instruction bundle pair which corresponds to these zeros is subsequently deleted from the L0I 204, the act of reloading the instruction bundle pair into the L0I 202 and reloading the zeros from the L1B 208 provides no greater prediction accuracy than if the L0IBR 202 were just re-initialized to a default value by some lower cost means.

Another advantage of failing to write L0IBR initialization zeros into the L1B 208 is that failing to write this data into the L1B 208 reduces the amount of "write" traffic for the L1B. This is particularly important if the L1B 208 has limited write bandwidth (e.g., if the L1B 208 has only a single read/write port, a reduction in the number of L1B writes would free up more bandwidth for L1B reads). Note however that an all zeros STH chunk 302 does need to be written into the L1B 208 when a substantive non-zero chunk 302 is already maintained in the L1B 208. Otherwise, a reload of data into the L0IBR 202 might result in a load of an out-of-date STH chunk 302.

In order to avoid unnecessary updates of the L1B 208, L1B relevancy information is maintained. This relevancy information is preferably stored in the L0IBR 202 (though it need not be), and is stored for each STH chunk 302, 304 which might at some point be written into the L1B 208 (i.e., it is stored for at most two STH chunks 302, 304 per instruction bundle pair). The relevancy information corresponding to a single STH chunk 302 need only consist of a single bit of information. L1B relevancy bits are initialized when an instruction bundle pair is fetched from the L1 cache 206 and a corresponding attempt is made to fetch prediction information from the L1B cache 208. If an attempted fetch of an STH chunk 302 from the L1B 208 results in an L1B miss, the STH chunk 302 which was to be filled with the missing L1B data is initialized to a default value, and its corresponding L1B relevancy bit is set to "0". The relevancy bit therefore indicates that the L1B 208 does not contain a backup copy of the newly initialized STH chunk 302.

If an attempted fetch of an STH chunk 302 from the L1B 208 results in an L1B hit, but the data read from the L1B 208 is the same as the default value which would be generated for the STH chunk 302, an STH chunk 302 can be filled with the data fetched from the L1B 208. Alternatively, the STH chunk 302 could be set to its default value by a separate default initializer. When the L1B 208 generates a hit, but does not provide prediction information which is any better than that provided by a cheaper L0IBR initialization means, the L1B relevancy bit corresponding to a newly filled STH chunk 302 is also set to "0".

A determination as to whether an L1B hit results in reading all zeros or all ones from the L1B 208 can be made via a simple NOR or AND of the bits read from the L1B 208.

If an attempted fetch of an STH chunk 302 from the L1B 208 results in an L1B hit, and the data read from the L1B 208 provides prediction information which differs from that which can be generated by the afore-mentioned default initializer, then the L1B relevancy bit corresponding to a newly filled STH chunk 302 is set to "1", thereby indicating that the L1B 208 does hold a relevant backup history for the STH chunk 302.

Figure 5:
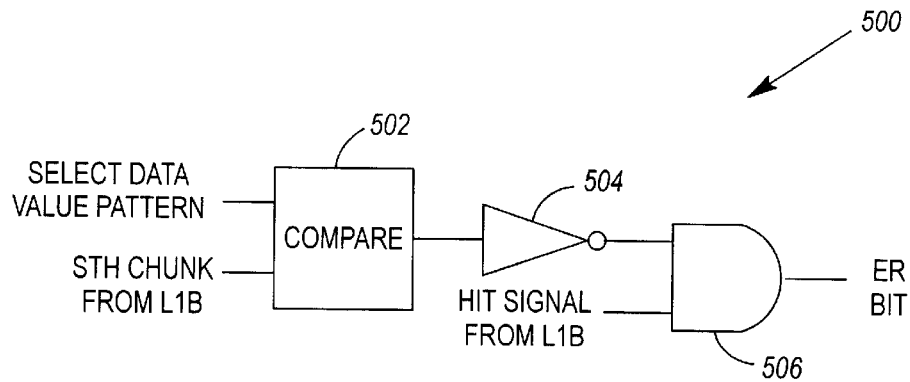
FIG. 5 illustrates an exemplary circuit for determining an initial state of "relevancy information", which relevancy information indicates whether relevant information is stored in the higher level prediction cache of the FIG. 2 memory hierarchy.

An exemplary circuit 500 for initializing L1B relevancy bits is illustrated in FIG. 5. A comparator 502 compares a select data value pattern (or patterns), such as all logic zeros, with an STH chunk 302 retrieved from the L1B 208. If the two values do not agree (indicated by the output of an inverter 504), and there is a hit in the L1B 208, an appropriate L1B relevancy bit (ER bit) is set to "1" (at the output of AND gate 506). Otherwise it is set to "0".

In a preferred embodiment of the L0IBR, relevancy bits corresponding to the STH chunks 302, 304 used by an instruction bundle pair are stored in STH chunks 306, 308 which are not used to store branch history and trigger prediction information. When a given instruction bundle pair uses more than two of its L0IBR STH chunks 302–308 for the storage of branch history and trigger prediction information, relevancy bits are not stored in the L0IBR 202, and the L1B 208 is not used to backup data for the given instruction bundle pair. If an instruction bundle pair uses only two of its L0IBR STH chunks 302, 304 for the storage of branch history and trigger prediction information, but uses them to form an encoded set 400, a pair of relevancy bits for the encoded set can still be stored in the two remaining L0IBR STH chunks 306, 308, and the encoded set 400 can then be backed up in the L1B 208 in the same manner that two non-encoded STH chunks 302, 304 would be backed up.

3. New Branch Prediction Structures

There are two new branch prediction structures 210, 212 illustrated in FIG. 2. The first 210 is part of an instruction pipeline's "front-end" and generates a "speculative" branch prediction upon fetch of a branch. The second 212 is part of an instruction pipeline's "back-end" and generates a "non-speculative" branch prediction upon retirement of a branch.

Upon fetch of an instruction bundle pair and its corresponding prediction information from the integrated low level cache 200, the fetched prediction information, as well as its address, are provided to the speculative new branch prediction structure 210. The speculative new branch prediction structure 210 preferably comprises a number of sub-structures, including a pattern history table (PHT) and an IP-relative adder.

The pattern history table is a table comprising rows of counters which correspond to the various patterns of branch history bits which can be stored as part of an L0IBR STH chunk 302. For example, if an STH chunk 302 holds four bits of branch history, the PHT holds $2^4$ (or 16) counters which correspond to the various patterns which the four history bits can assume. The PHT is preferably addressable on a quasi per-address basis. In other words, a distinct row of 16 counters may not exist for every instruction address, but enough rows of counters are provided such that aliasing is limited to an acceptably low frequency. When a branch retires in the back-end of a pipeline, a counter corresponding to a branch history which existed for the branch at the time it was fetched (i.e., a history retrieved from the L0IBR 202 when the branch was fetched) is updated appropriately (e.g., incremented if the branch was taken, and decremented if the branch was not taken). The FIG. 2 apparatus therefore not only makes a branch prediction based on a history of previous branch outcomes, but it also makes a branch prediction based on the history of a previous history pattern for a branch. The pattern history table, in conjunction with the branch histories stored in the L0IBR 202, forms part of a two-level branch prediction algorithm. A variety of forms which the PHT may assume are disclosed in the article of Yeh and Patt referred to supra. This article is hereby incorporated by reference for all that it discloses.

Note that although the PHT is disclosed as part of the speculative new branch prediction structure 210, the counters maintained by the PHT are only updated non-speculatively.

When an STH chunk 302 is fetched from the L0IBR 202, the trigger portion of the chunk 302 is shifted into its most recent history bit position, and a least recent history bit is shifted out of the STH chunk 302. This new history, as well as a portion of its corresponding bundle address, are then used as indexes into the PHT for determining a next fetch trigger which is to be stored as part of the STH chunk 302.

The speculative new branch prediction structure also comprises an IP-relative adder. After each branch history in STH chunks 302–308 used by a fetched instruction bundle pair is updated, and the updated histories are used to retrieve updated trigger values from the PHT, a most recent bundle pair entry point, in combination with the updated trigger values, are used to determine the first predicted taken branch after the bundle pair entry point, if any. The IP-relative adder then adds the offset carried by the predicted taken branch instruction to an instruction pointer value corresponding to the branch's bundle address, thereby generating a new target prediction.

All of the updated prediction information generated by the speculative new branch prediction structure 210 is then provided to multiplexer 228 for subsequent use in updating the ISBBR 226 (which has yet to be discussed) and/or the L0IBR 202. The new trigger prediction which is generated for a branch by the speculative new branch prediction structure 210, as well as the new target (if the branch is the first predicted taken branch following a most recent bundle pair entry point), form information which predicts the next fetch outcome of a branch instruction stored in the ISB 226 or L0I 204. Since this information is generated speculatively by an instruction pipeline's front-end, it is ready and available at the next fetch of a branch instruction, which next fetch may be before the branch retires from its previous fetch. Furthermore, the prediction information is available for the purpose of resteering an instruction pointer without penalty, as will be discussed later in this description.

Branch prediction information fetched from the L0IBR 202 is also passed down a pipeline (i.e., through rotator mux 234 and a branch execution unit 236 (which may be one of many)). When a branch corresponding to the prediction information retires at the back-end of a pipeline, it is passed to the non-speculative new branch prediction structure 212 along with its current fetch prediction information, at which time a non-speculative next fetch prediction can be made for the branch. A non-speculative branch prediction is passed to multiplexer 228, and can be used to fix-up an incorrect speculative prediction which was stored to the ISBBR 226 or L0IBR 202.

As L0IBR STH chunks 302, 304 are updated, the L1B 208 and appropriate L1B relevancy bits stored in the L0IBR 202 must also be updated. Determinations as to whether the L1B 208 and appropriate L1B relevancy bits should be updated are preferably made by the non-speculative new branch prediction structure 212.

Each time the non-speculative new branch prediction structure 212 determines that an L0IBR STH chunk 302 needs to be updated, it must also determine whether the L1B 208 and a corresponding L1B relevancy bit stored in the L0IBR 202 must also be updated. In a preferred embodiment of the non-speculative new branch prediction structure 212, an updated STH chunk 302 is written into the L1B 208 based on 1) the status of the relevancy information corresponding to the last fetch of the STH chunk 302 from the L0IBR 202, and 2) a determination as to whether an updated STH chunk 302 which is to be written into the L1B 208 matches one or more select data value patterns. The select data value patterns should preferably coincide with one or more of the values to which a default initializer for the L0IBR 202 can initialize an STH chunk 302.

For example, a determination that the L1B 208 should be updated can be made when an updated STH chunk 302 does not match one of the one or more select data value patterns. A determination that the L1B 208 should be updated can also be made when the status of an appropriate L1B relevancy bit indicates that the L1B 208 contains relevant data which needs to be kept current so as to avoid hitting on an incorrect STH value when the L1B 208 is accessed in the future.

Figure 6:
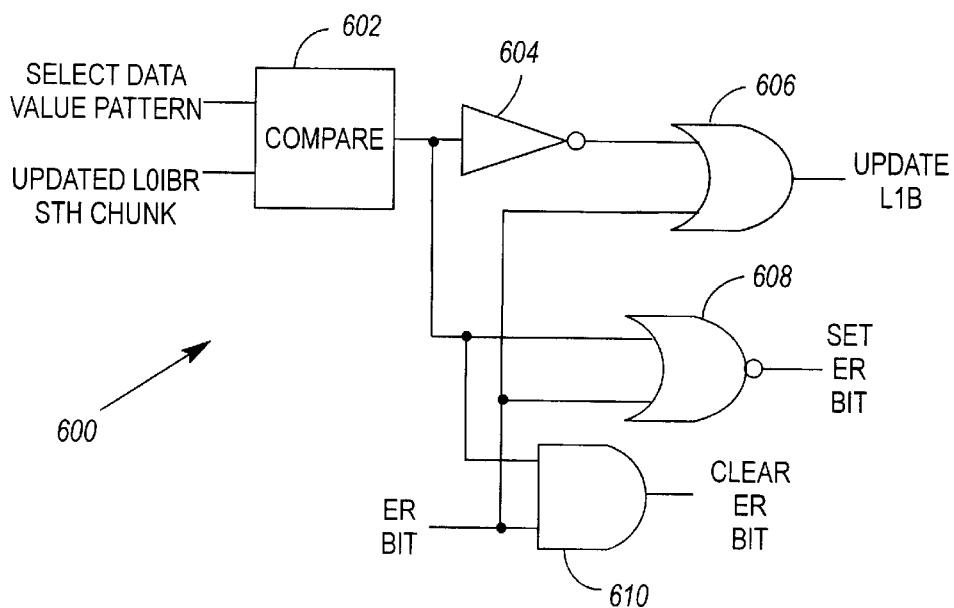
FIG. 6 illustrates an exemplary circuit for determining 1) whether the higher level prediction cache of the FIG. 2 memory hierarchy should be updated, and 2) whether the relevancy information referred to in FIG. 5 should be updated.
Figure 9:
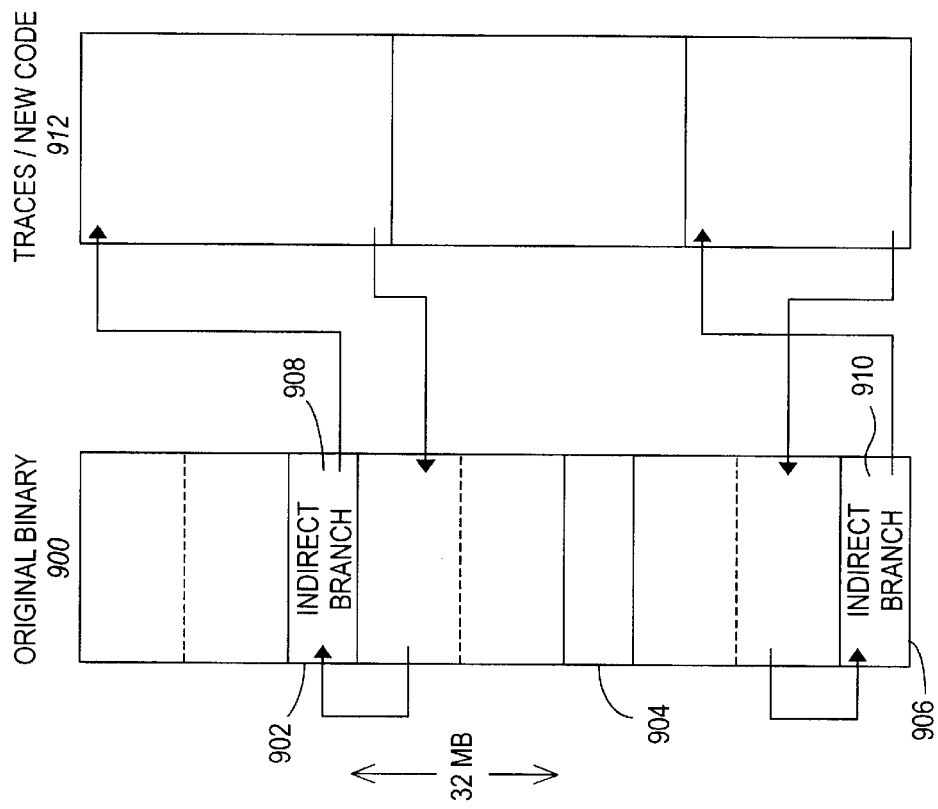
FIG. 9 illustrates a branching to patch code which is implemented in a more or less contiguous section of code, wherein the branching is executed using trampoline code, which trampoline code is implemented in holes in program code.
Figure 8:
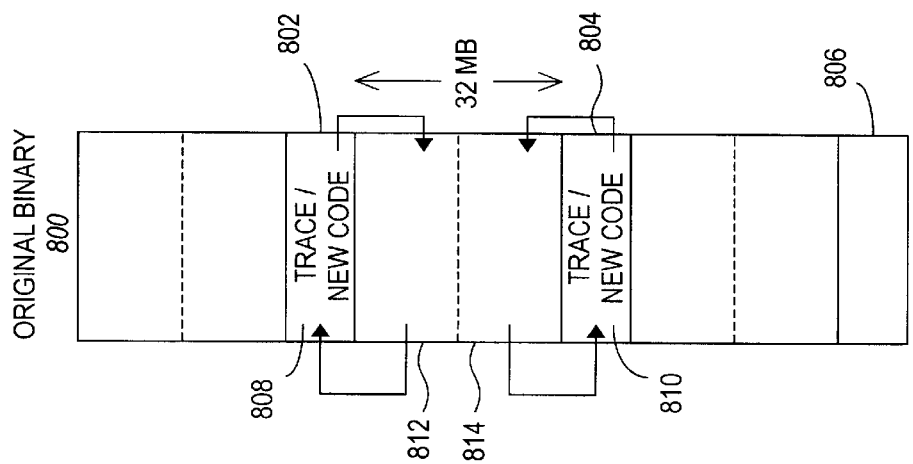
FIG. 8 illustrates a branching to patch code which is implemented in holes in program code.

An exemplary circuit 600 for determining whether the L1B 208 needs to be updated is illustrated in FIG. 6. A comparator 602 compares a select data value pattern (or patterns) with an updated STH chunk 302. If the two values do not agree (indicated by the output of the inverter 604), the L1B 208 is updated. Also, if an L1B relevancy bit (ER bit) indicates that the L1B 208 contains relevant data, then the L1B 208 needs to be updated so as to keep the L1B data current. As a result, an OR 606 of the above two possibilities determines whether an L1B update occurs.

An exemplary circuit 600 for updating L1B relevancy bits is also illustrated in FIG. 6. If the two values input to the comparator 602 do not agree, and a corresponding ER bit is currently not set (e.g., it is a logic zero, and it indicates that no relevant information currently exists in the L1B 208), then the ER bit is set (indicated by the output of the NOR gate 608). If the two values input to the comparator 602 do agree, and the ER bit is set (e.g., it is a logic one), then the L1B relevancy bit is cleared (indicated by the output of the AND gate 610). If neither of the above conditions is met, the state of an ER bit can remain unchanged. Note that when the state of an updated ER bit matches the state of an existing ER bit, an update of the bit may be foregone using appropriate logic.

4. Branch Retirement Queue

Working in cooperation with the new branch prediction structures 210, 212 is a branch retirement queue 214. When a branch instruction is fetched for execution, the speculative new branch prediction structure 210 updates the L0IBR 202. When a branch instruction retires (i.e., when execution of the branch instruction is completed), the branch retirement queue 214 assists the non-speculative new branch prediction structure 212 in fixing-up incorrect L0IBR updates. The branch retirement queue 214 also aids in fixing-up the L0IBR 202 when an instruction pipeline is flushed before a branch has a chance to retire.

The branch retirement queue 214 is preferably implemented as a 16 entry queue which is divided into two eight entry banks. When branch prediction information is read from the L0IBR 202, the prediction information is written into the branch retirement queue 214. After a branch retires, it is removed from the queue 214. When a pipeline flush is encountered, the entries in the branch retirement queue 214 are written back into the ISBBR 226 and/or L0IBR 202.

5. Instruction Pointer Generator

The FIG. 2 apparatus also comprises an instruction pointer generator 216 (IP generator). At the heart of the IP generator 216 is an IP generator multiplexer 218 if (IP Gen Mux). Triggers of branches fetched from the L0IBR 202 are ORed together and provided to selection control logic 220 for the IP Gen Mux 218. A target which is associated with the triggers is provided to a data input of the IP Gen Mux 218. The IP Gen Mux 218 also receives other data inputs, including an address which is incremented by one (by INC 219) over the IP address which was previously generated by the IP Gen Mux 218. Unless a branch instruction directs otherwise, the IP is incremented by one bundle address each time an instruction bundle is executed. However, a branch instruction can cause bits of a target address to overwrite part or all of the previous value of the IP.

Since predicted branch triggers and targets are stored in the LOIBR 202, and are fetched upon fetch of a corresponding branch instruction, they can be provided to the IP generator 216 without a resteer penalty, and no delay is incurred due to a need to separately fetch a branch history, check its validity, calculate a trigger prediction, and then fetch or calculate a target address (if necessary). As a result, the integrated low level cache 200 and its associated branch prediction hardware enable an instruction pointer resteer which does not require bubbles to be injected into an instruction pipeline.

Note that the instruction pointer's ability to address instructions and prediction information stored in a single cache reduces the load which the instruction pointer must drive, thereby allowing it to drive data more quickly.

6. Long Branch Specific Hardware Requirements

Figure 11:
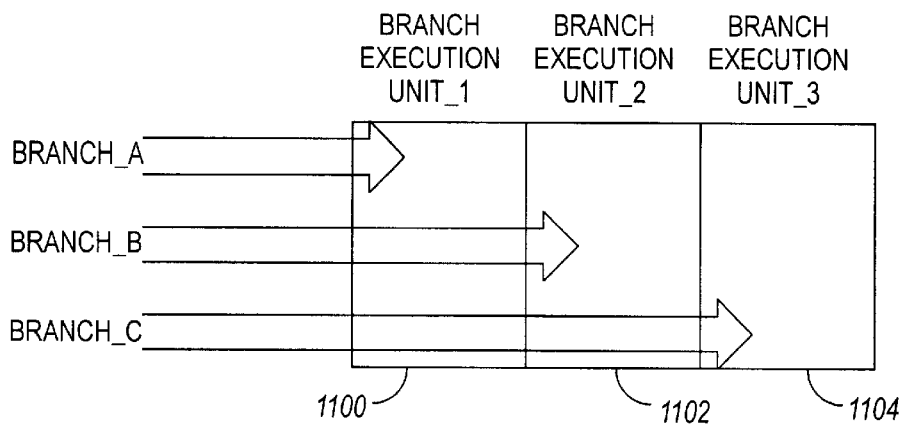
FIG. 11 illustrates a plurality of physically adjacent branch execution units.
Figure 12:
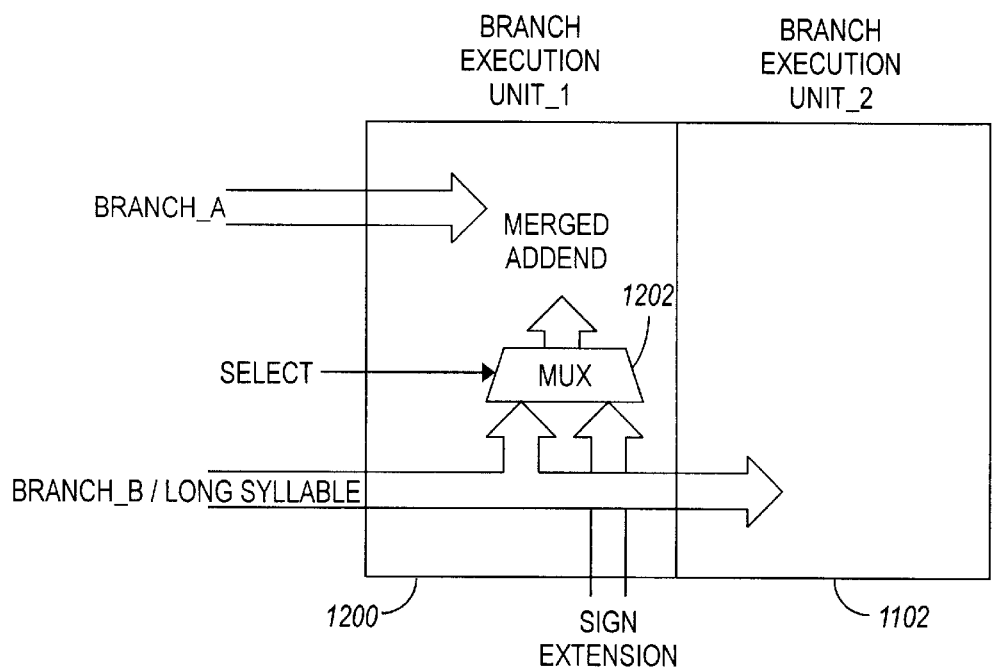
FIG. 12 illustrates two of the FIG. 11 branch execution units, wherein a first of the branch execution units has been modified to alternately receive a number of bits of a long IP-relative branch instruction syllable, or a number of sign extension bits, as part of one of its addends.

It was previously noted that probably the most significant hardware feature which is needed to support the execution of long branch instructions is a branch execution unit which is capable of adding a longer offset to the value of an instruction pointer. This change is illustrated in FIGS. 11 & 12, which figures respectively portray a number of branch execution units 1100, 1102, 1104, 1200 which might appear in place of the single branch execution unit 236 illustrated in FIG. 2. The first set of branch execution units 1100–1104 (FIG. 11) support only single-syllable branching, while the second set of branch execution units 1200, 1102 (FIG. 12) support single-syllable as well as long branching.

In FIG. 11, up to three single-syllable branch instructions (BRANCH_A, BRANCH_B and BRANCH_C) can simultaneously and respectively be executed on three different branch execution units 1100–1104. Note that the wires which route instruction bits to branch execution units__2 and __3 1102, 1104 cross over branch execution unit__1 1100. As a result, the wiring tracks which are needed to supply branch execution unit__1 1100 with the additional offset bits carried by an L instruction syllable already exist. The following relatively trivial changes are therefore the only significant changes which need to be made for branch execution unit__1 1100 to support long branch instructions.

First, assuming that branch execution unit__1 1100 already has to implement an approximate 20-bit adder, with sign extension out to approximately 60 bits (in order to calculate the branch targets of single-syllable IP-relative branches in the IA-64 architecture), this 20-bit adder needs to be converted to a 64-bit full adder. This is a relatively small change to implement since sign extension cells associated with the 20-bit adder need only be converted to adder cells (i.e., structure must be provided for accepting an additional input in each of these cells).

Second, a multiplexer 1202 (with multiple inputs and outputs) must be provided for alternately providing an input of the newly converted adder cells with either sign extension data (when calculating the target of a single-syllable branch) or L syllable offset bits (when calculating the target of a long branch). The above two bit sets can merely be provided to first and second data inputs of the multiplexer 1202, and when the branch execution unit 1200 is configured in a first mode (for handling single-syllable branches), the sign extension bits can be input to bit positions of an offset addend provided to the branch execution unit 1200, and when the branch execution unit 1200 is configured in a second mode (for handling long branches), L syllable offset bits can be input to bit positions of the offset addend.

A third change to the FIG. 11 branch execution unit structure 1100 is that additional offset bits which might be carried by the BRANCH_B wiring tracks need to be dropped into branch execution unit 1200 via a tee of the BRANCH_B wiring tracks to the second inputs of the newly added multiplexer 1202.

Overall Structure/Operation of Micro-Architecture

When instructions which are needed by an instruction pipeline do not already reside in the LOI portion 204 of the integrated low level cache, a fetch process issues a request for data to the L1 206 and L1B 208 caches. Data fetched from the L1B 208, if any, is temporarily stored in a structure which is designated in FIG. 2 as the RAB 222 (a buffer). When an instruction bundle pair is returned from the L1 cache 206, the instruction bundle pair, including the templates of its instruction bundles and any STH chunks 302–308 retrieved from the L1B 208 are used to calculate a target (via TARG CALC 224) for the first predicted taken branch of the bundle pair (if any). If STH chunks 302–308 are not stored in the L1B 208, default values for these chunks are also generated. The STH chunks 302–308, a number of target bits, target correlation bits, and instruction bundle pair are all provided to the ISB/ISBBR 226. The ISB/ISBBR 226 serves as a buffer for respectively filling entries in the integrated low level cache 200.

Note that the target of a long IP-relative branch instruction fetched from the LOI 206 can be calculated in the same manner that the target of a single-syllable branch instruction is calculated. The only difference is that the target of a long branch will be mispredicted more often due to the limited size of the target calculation adder 224, which is preferably only large enough to calculate a single-syllable branch target. However, if available chip area so permits, the target calculation adder 224 could be transformed into a 64-bit full adder (as was done in the branch execution unit 1200, FIG. 12).

When an instruction bundle pair is fetched from the LOI 204, its corresponding branch prediction information is fetched from the LOIBR 202. This includes information which predicts the current fetch outcomes of branch instructions in the bundle pair.

When an instruction bundle pair is fetched from the LOI/LOIBR 200, LOIBR target information, if any, is provided as a data input to the IP Gen Mux 218, and trigger prediction information from relevant STH chunks 302 is ORed together and presented to the select logic 218 for the IP Gen Mux 218. Thus, a quick one-cycle resteer of the instruction pointer is possible.

All LOIBR information is presented to the new branch prediction structures 210, 212, as well as to the branch retirement queue 214, for purposes which have already been described. Of note, information which predicts a next fetch outcome of a branch instruction is speculatively determined by the speculative new branch prediction hardware 210, and is written back into the ISBBR 226 and/or LOIBR 202 so that it is available before the next fetch of a branch instruction. As a result, valid next fetch prediction information is always available.

Instructions which are fetched from the LOI 204 are placed in an instruction buffer-232 (e.g., via way mux 230), and are sequentially routed to appropriate execution units (e.g., branch execution unit 236) via a rotator mux 234.

Outputs of the new branch prediction structures 210, 212 and the branch retirement queue 214 are provided to a switching means (e.g., a multiplexor 228), which thereafter provides updated information to the L0IBR 202, either directly, or by way of the ISBBR 226.

Note that a preferred embodiment of the L0IBR 202 stores 40-bits of target information (3 high order bits and 37 low order bits). This target information can be single-syllable or long branch target information. As a result, a long branch target will be correctly predicted by the L0IBR 202 so long as the branch does not redirect an instruction pointer outside of a $2^{37}$-bit address space. Improved prediction accuracy for long branches could be increased by storing more bits of target information in the L0IBR 202.

Alternatives

The above disclosure has referred to a processor which fetches instructions in bundle pairs. As a result, a plurality of branch prediction information entries which map to a bundle pair of instructions has been discussed. However, it is believed to be within the scope of the invention to manage branch prediction in a similar manner for processors which fetch instructions singularly, in bundles, or in bundle groups (such as a bundle pair).

The above disclosure has also referred to IA-64 instruction bundles throughout. When the methods and apparatus disclosed herein are used to manage prediction information on a bundle basis, it is believed to be within the scope of the invention to manage prediction information for bundles having alternate forms. For example, an instruction bundle might comprise more or fewer instruction bundles. An instruction bundle might also comprise a different template form, or no template at all, as might be the case if each instruction syllable could only accept a certain type of instruction, of if each instruction conveyed instruction type information.

It is also noted that any number and/or types of branch prediction information may be stored in the integrated low level cache 200. The selection of which types of information are stored in the L0IBR 202 (and how much information is stored in the L0IBR 202) might vary depending on a particular application. However, more or less prediction information could be stored in the L0IBR (and the L1B). For example, the 40-bits of IA-64 target information could be increased to a full 64-bits of IA-64 target information. Likewise, the length of branch histories stored for each branch instruction in the L0I 204 could be increased or decreased, or the number of such branch histories (or STH chunks 302–308) made available could be increased or decreased.

In addition, various portions of the FIG. 2 apparatus may be implemented together (as shown) or individually, with separately implemented portions providing only some of the advantages provided by the FIG. 2 apparatus as a whole.

Applications Which Benefit From a Long IP-Relative Branch Instruction

1. Stub Reduction

Various applications which have been written for Hewlett-Packard's PA-UX platform already use code which approaches or exceeds 16 MB (e.g., Oracle uses 17 MB of code, and Pro/E uses 30 MB of code). In addition, many applications which have been written for the Intel x86 platform, including Microsoft® Windows 95/98/NT applications, use code which is several megabytes in length. Since application code size is increasing in general, many program load modules will soon exceed 16 MB.

When a call type branch (e.g., br.call in IA-64) in a given load module cannot reach a target which is located within the same load module, a compiler/linker has previously had to insure the reach of some targets by using a "branch stub" (e.g., a code sequence that culminates with the execution of an indirect branch instruction). In IA-64, the code sequence of a branch stub typically takes 3 cycles to execute. Furthermore, the probability of mispredicting an indirect branch instruction is somewhat greater than the probability of mispredicting a regular IP-relative branch instruction.

By using a single long branch instruction in place of a branch stub, a compiler/linker can minimize the number and overhead of such stubs. Stub overhead includes, but is not limited to, 1) the need to free up an available general register and branch register for the purpose of moving an indirect branch target into the branch register, and 2) the need to preserve the indirect branch target in the branch register so as to streamline repeated executions of the indirect branch instruction, and to decrease the probability of mispredicting the indirect branch.

2. Dynamic Instrumentation

Dynamic instrumentation is the process of patching dynamically generated code sequences into specified points (patch points) in already compiled and linked program code (application and/or kernel). Patching results in the overwrite of a machine code instruction at a patch point, with a branch to patch code (see FIGS. 14, 15 & 17). If the platform for which program code is generated processes instructions in instruction bundles, as in IA-64, the use of dynamic instrumentation requires 1) a dynamically generated code sequence which is to be inserted at a patch point, 2) part of an instruction bundle which is patched at the patch point, and 3) a branch back to the instruction bundle which follows the instruction bundle comprising the patch point.

Two performance measurement tools which use dynamic instrumentation techniques are Paradyn and Kerninst. A discussion of Paradyn is found in "The Paradyn Parallel Performance Measurement Tools" by Miller, Callaghan, Cargille, Hollingsworth, Irvin, Karavanic, Kunchithapadam and Newhall (IEEE Computer 28, 11, November 1995). A discussion of Kerninst is found in "Fine-Grained Dynamic Instrumentation of Commodity Operating System Kernels" by Tamches and Miller (Computer Sciences Department, University of Wisconsin at Madison, July 1998).

While Paradyn is designed to instrument applications, Kerninst is designed to instrument kernels. Paradyn has been ported to several platforms, and Kerninst has been implemented on a stock production Solaris 2.5.1 kernel. According to the developers of Kerninst, the greatest challenge to patching dynamically generated code sequences into program code is that branch instructions in all architectures lack sufficient branch span (or range). As a result, a performance measurement tool such as Kerninst must locate safe places in program code (e.g., holes) in which trampoline code can be inserted.

Dynamic instrumentation has several applications. For example, it can be used in conjunction with performance profiling, testing, debugging, extension of kernel function, security checking, and tracing.

With respect to testing, code coverage can be monitored by patching patch points into the code (e.g., one patch point per basic block). When a patch point is reached, a corresponding flag is set to indicate that the patch point has been reached. The patch point in each basic block can then be removed as soon as its corresponding flag is set. Such instrumentation has very low runtime overhead.

With respect to debugging, conditional breakpoints and breakpoints with actions can be efficiently implemented using dynamic instrumentation.

With respect to application and kernel tracing, logging code can be patched into locations that it is desirable to trace. After a trace has been collected, the code at a patch point can then be restored to its original contents. This kind of dynamic tracing is more efficient and convenient than a static tracing approach.

The availability of a long IP-relative branch instruction significantly improves the robustness, reliability, and code efficiency for dynamic instrumentation. One way that the long IP-relative branch instruction achieves these advantages is by greatly simplifying the patching of dynamic instrumentation into program code. A comparison of patching with single-syllable IP-relative branch instructions versus patching with long IP-relative branch instructions is found later in this Description.

3. Post-Link Time Optimizers

A post-link time optimizer (or binary optimizer) reads in an executable (i.e., program code), optimizes it and writes out a new, improved version of the executable. Profile feedback from previous runs of the code is often used to guide optimizations for such optimizers. Spike and Etch are two examples of post-link, time static optimizers. A discussion of Spike is found in "Optimizing Alpha Executables on Windows NT with Spike" by Cohn, Goodwin and Lowney, (Digital Technical Journal, June 1998). A discussion of Etch is found in "Instrumentation and Optimization of Win32/Intel Executables Using Etch" by Romer, Voelker, Lee, Wolman, Wong, Levy, Chen and Bershad (Proceedings of the USENIX Windows NT Workshop, August 1997).

Optimizing an executable after it has been compiled and linked has several advantages. First, an optimizer can see an image of the entire executable, and can therefore perform interprocedural optimizations such as code layout optimizations and procedure in-lining (NOTE: a static compiler cannot inline cross DLLs). Second, an optimizer can use profile feedback more effectively (especially when the profile is generated at a user's site).

In order to completely rewrite an executable, the typical post-link time optimizer needs certain information from the compiler and the linker. For example, information about irregular control, self-modifying code, data embedded in text, procedure starting/entry addresses, and how to identify jump tables are all critical to an optimizer's rewrite of a procedure. However, note that optimizations of an executable can be performed without source code being available.

Figure 13:
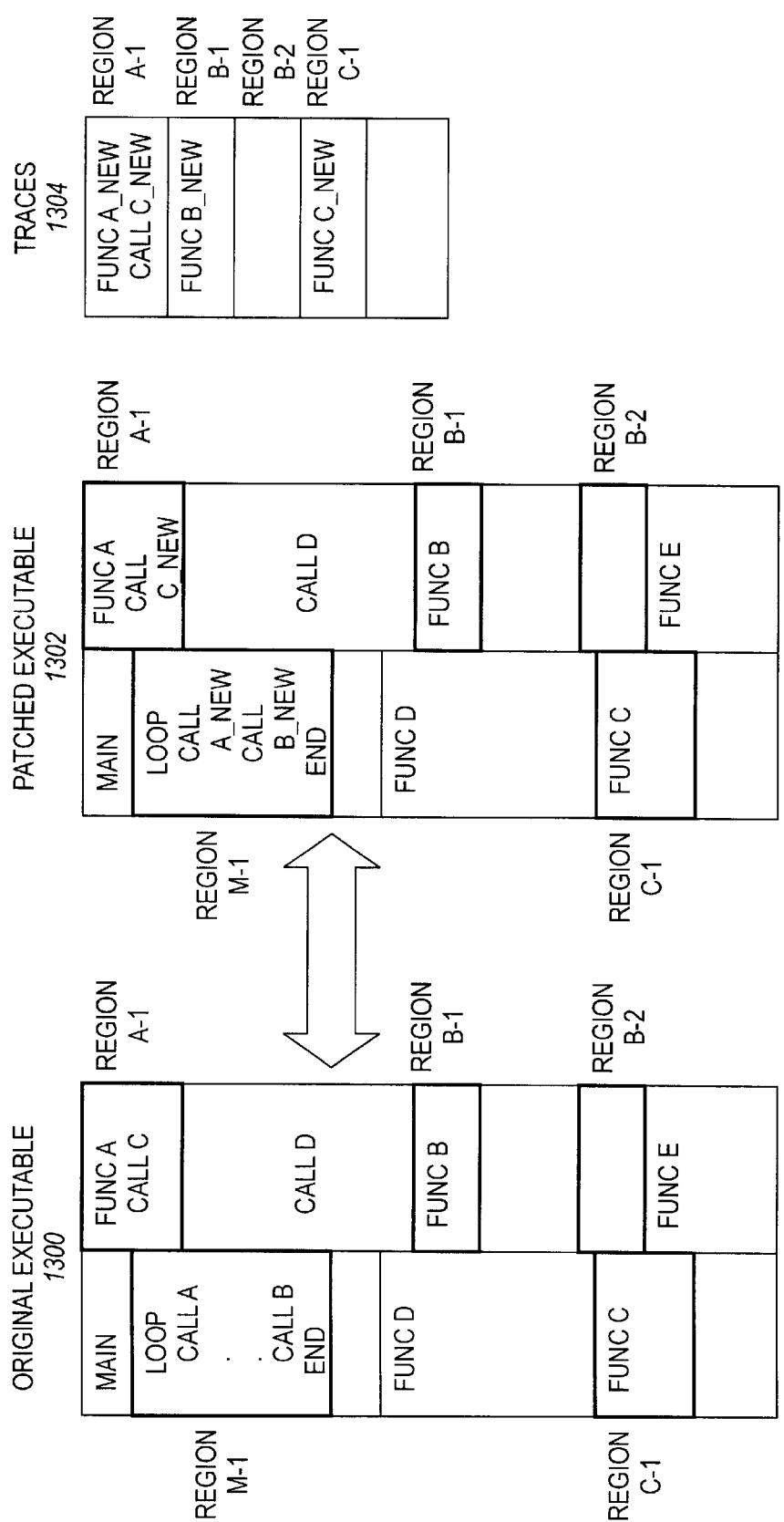
FIG. 13 illustrates operation of a post-link time optimizer.

Optimizations performed by the Spike optimization system are procedure based. Frequently used procedures can be rewritten into a new code area 1304, and old calls can be re-directed to newly written and optimized procedures. FIG. 13 illustrates an example of how the Spike optimization system might optimize an executable.

FIG. 13 illustrates an arbitrary executable 1300. The boundaries of hot regions of the executable 1300 (i.e., regions which might benefit from optimization) are illustrated by bolding in FIG. 13. It can be assumed that the locations of the hot regions were identified through profiling (e.g, by instrumenting the executable, or by monitoring hardware performance). Note that the main program of the FIG. 13 executable 1300 comprises a loop which calls functions A and B. Function A has a hot region, A-1, which calls function C. Function B has two hot regions, B-1 and B-2. Function C has a single hot region, C-1.

As shown in FIG. 13, the Spike optimization system conducts three major optimizations for the FIG. 13 executable 1300. First, it copies the hot regions of each procedure into a new code space 1304. Cold regions are left in the original executable 1302. Exits from an optimized hot region in the new code space 1304 therefore transfer program flow control back to a cold region in the original executable 1302. Second, the code sequence of each hot region in the new code space 1304 is rearranged to improve sequential locality. Third, the optimized hot regions are arranged in the new code space 1304 according to the executable's call graph and call frequencies. After creating and optimizing hot regions in the new code space 1304, all calls to hot regions in the original executable 1302 are redirected to their corresponding optimized hot regions in the new code space 1304.

On an Alpha/NT system, the above optimizations speeded up several call-intensive applications by about 10% (see the Spike article referenced supra). The increases in speed were mostly due to improved instruction cache locality. Since the cache hierarchy in an IA-64 processor is similar to that of an Alpha EV-5 processor, it is believed that such optimizations would yield similar results for IA-64 applications.

For the above optimizations to be performed, it is crucial that the branches which transfer control to the optimized hot regions require the patching of no more than a single instruction bundle. Such patching cannot be performed without long IP-relative branches. Although a sequence of instructions culminating in an indirect branch (e.g., MOVL, MOV-to-br, and BR) can obtain the same effect, such a code sequence would require the overwrite of more than a single instruction bundle in the original executable (e.g., due to data dependence and template usage). Furthermore, such a code sequence requires the use of a reserved general register and a reserved branch register. It is inefficient for a compiler/linker to reserve one or more general and branch registers throughout a program's execution so that the registers would be available at some point in time for as yet undetermined optimization efforts. Alternatively, if an executable is generated by a tool that follows run-time architecture conventions, then an optimizer could search a procedure to figure out if a scratch register is not being used. However, even so, the patching of multiple bundles is difficult, since an optimizer must make sure that a second bundle to be patched does not hold a branch target.

Although it is possible to patch multiple bundles for basic blocks with more than one bundle if there are complete compiler/linker annotations, an optimizer may not want to rely on such information. This is because IA-64 is intended to be a common and open platform, and executables and libraries will ultimately be provided for IA-64 by many different vendors. It is unlikely that all of these vendors will support the annotations which are defined for HP/Intel optimizers.

Instruction Bundle Patching

1. How to Patch a Bundle

To utilize either dynamic instrumentation or a post-link time optimizer, instruction bundles need to be patched on-the-fly. To avoid any possibility of having a thread reading a partially updated bundle, the instruction bundle at a patch point, the start of an optimized procedure, or the start of a trace needs to be modified atomically. However, since IA-64 architecture does not provide an instruction for atomically writing a complete bundle (i.e., 128 bits), a pseudo-atomic write sequence must be used.

A dynamic patching tool would need to install a master signal handler to handle illegal operation faults and break instruction faults. When an illegal operation fault occurs, the handler can checks to see if a patcher was in the middle of updating an instruction bundle. Note that the above listed patch code sequence turns a flag on prior to beginning a patch, and turns the flag off after completing its patch. If the flag is on, the handler can assume that a fault was caused by patching. If the flag is off, the handler can read the faulting instruction again, and if the faulting instruction is now valid, the handler can assume that a fault was caused by bundle patching. If a fault is determined to have been caused by bundle patching, a handler can resume instruction execution. Otherwise, the fault can be assumed to be a real one triggered by program code. For a real fault, a master signal handler can pass it to a fault handler which is registered for the faulting application.

2. Patching a Bundle With a Single-Syllable IP-Relative Branch Instruction

Patching a bundle without the availability of a long IP-relative branch is not only tricky, but somewhat costly. Bundle patching must be thread safe. If a thread is suspended on a certain syllable of a bundle which is subsequently patched by a dynamic instrumentation or post-link time optimizer tool, the tool needs to make sure that the suspended thread can resume correctly on any syllable in the patched bundle.

Figure 14:
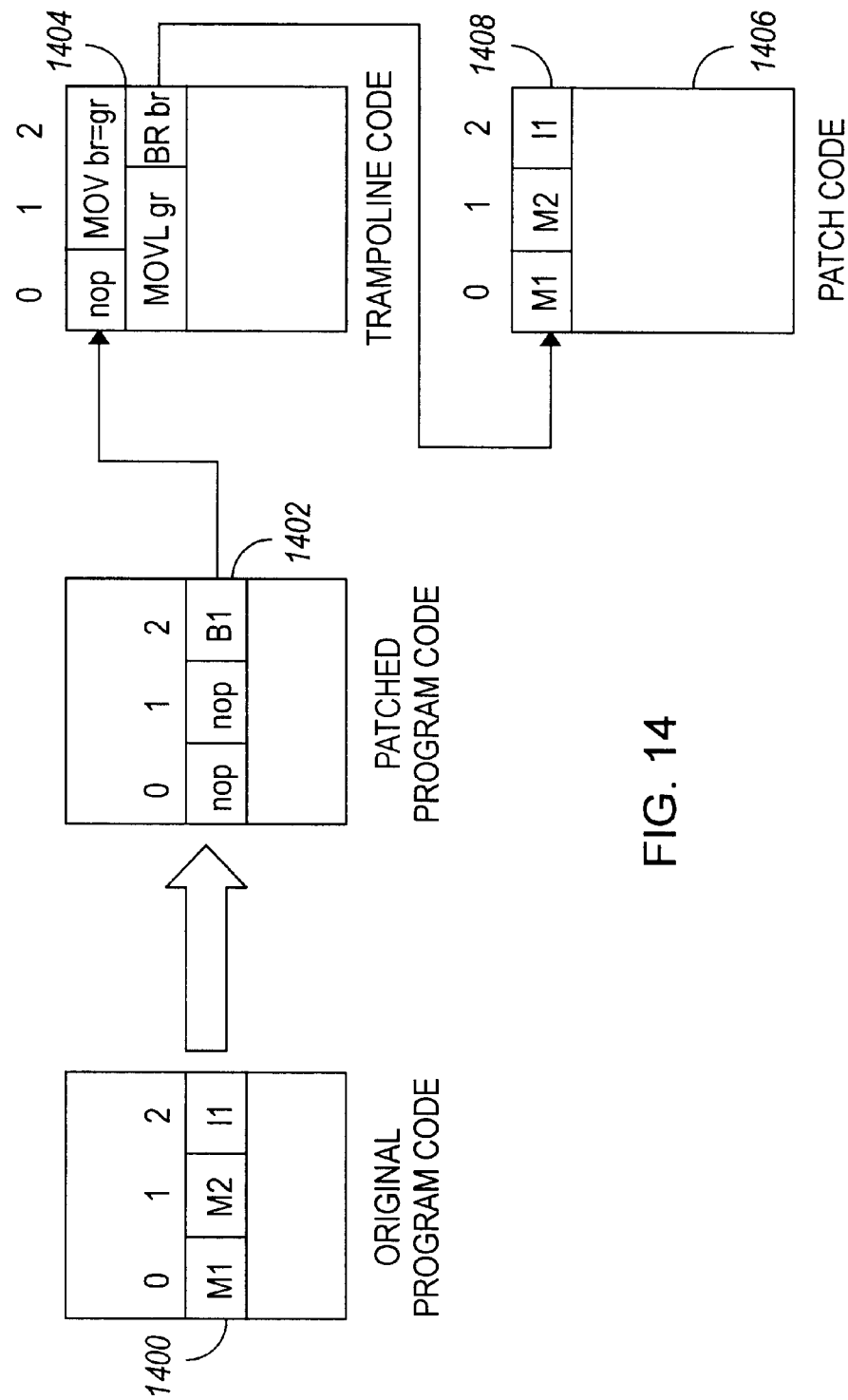
FIG. 14 illustrates a conventional bundle patching technique which is not thread-safe, but which may be used to statically patch program code.

FIG. 14 illustrates a traditional instruction patch. An existing instruction bundle 1400 (e.g., MMI) is copied into a code cache 1406, and the existing instruction bundle 1400 is then patched 1402 with a single-syllable IP-relative branch that jumps to the copied instruction bundle (perhaps via trampoline code 1404). This type of patching works for static code transformations, but is not safe for dynamic instrumentation. For example, when this sort of patching happens at run-time, it is possible that a thread might be suspended due to an exception generated at the M2 instruction (i.e., syllable 1). If patching occurs while the thread is suspended, and the suspended thread then resumes, program flow should proceed with the execution of instructions M2 and l1, and the instruction M1 should not be re-executed. However, as is evident in FIG. 14, traditional instruction patching causes re-execution of a complete instruction bundle 1408. As a result, suspension of a thread at the M2 instruction would result in re-execution of the M1 instruction.

Figure 15:
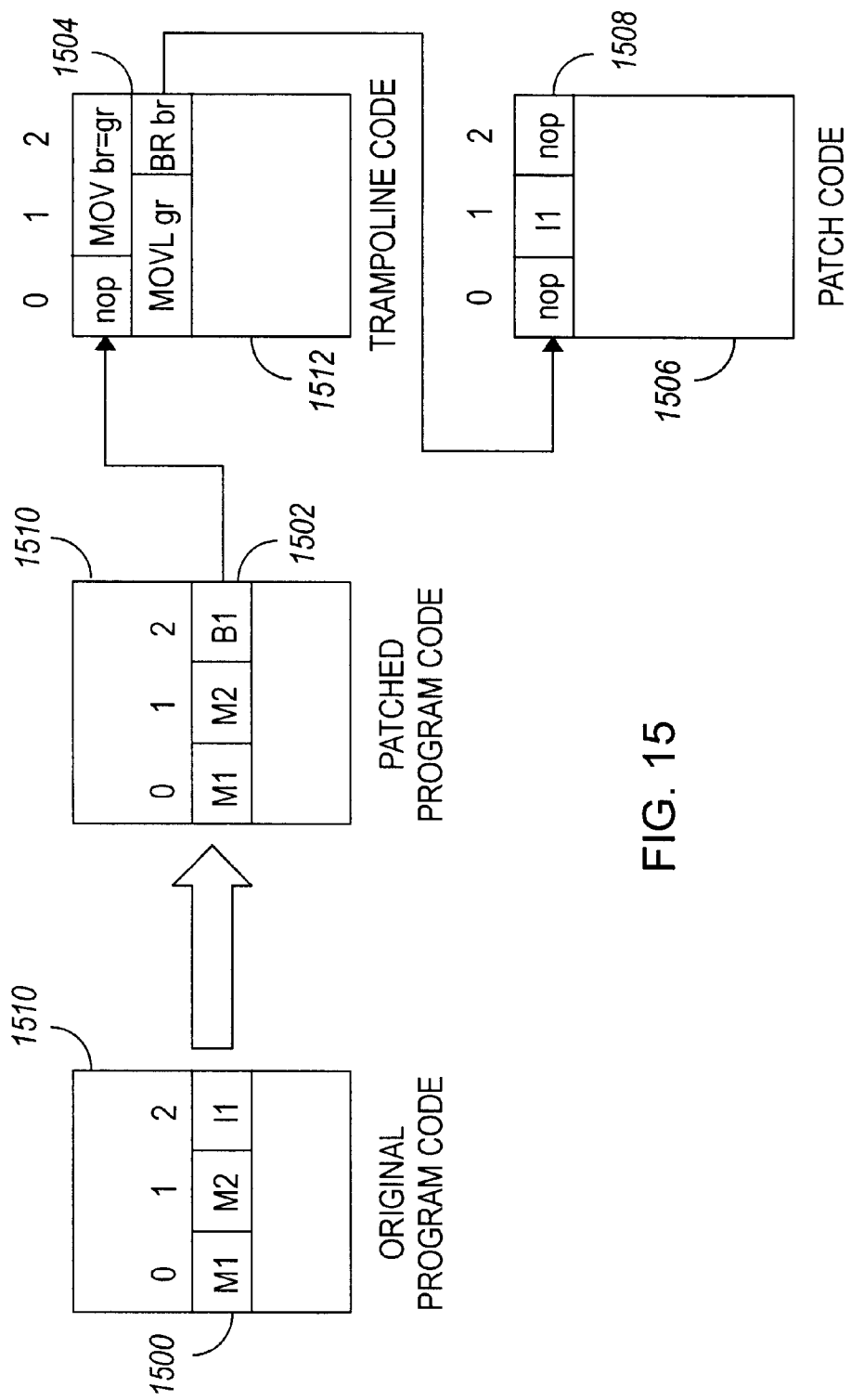
FIG. 15 illustrates a thread-safe version of the bundle patching technique illustrated in FIG. 14.

FIG. 15 illustrates a thread-safe bundle patching using a single-syllable IP-relative branch. Note that the original MMI instruction bundle 1500 is split into two bundles 1502, 1508. The syllable 2 integer instruction is copied to the code cache 1506 while the M1 (syllable 0) and M2 (syllable 1) instructions remain in the original executable 1510. When a suspended thread resumes from syllable 1 of the patched bundle 1502, it will now execute instruction M2, branch to the code cache 1506, and then execute instruction l1. When a suspended thread resumes from syllable 2, it will execute a branch to the code cache 1506, and then execute instruction l1. Once again, given the shorter range of a single-syllable IP-relative branch, it is often necessary to patch an executable 1510 by jumping to trampoline code 1512 and then executing an indirect branch 1504 from the trampoline code 1512 to the code cache 1506. The bundle patching illustrated in FIG. 15 is therefore thread safe.

Thread-safe patching with single-syllable IP-relative branches, for all IA-64 instruction templates, is illustrated in FIG. 16. Note that each template is patched in a more or less unique way, and that there are very few patching "rules" which can be distilled from FIG. 16. A dynamic patching tool therefore incurs a significant amount of overhead in determining how to patch a particular IA-64 instruction template in a thread-safe way. Although patching uniformity could be achieved by patching each IA-64 instruction template with a BBB bundle, wherein each branch in the patched bundle jumps to one of three sequential bundles (the first of which holds the instruction in syllable 0 of the original bundle, the second of which holds the instruction in syllable 1, etc.), such a patching methodology results in a lot of no-operation instructions ("nop" instructions) being placed in instruction bundles, thereby leading to more lengthy code sequences and pipeline bubbles (gaps).

There is one case in FIG. 16 which deserve additional explanation. Patching of the M,MI template requires additional care due to the implicit stop bit between syllables 0 and 1 (the stop is designated by the comma). Since there is no M,MB template, the only way to patch the bundle is by patching two branch instructions into the bundle and providing a distinct target for each of the branch instructions. Doing so yields an instruction bundle of the form m1-B1-B2, which bundle coincides with an MBB template. The target of branch B1 is an instruction bundle C, and the target of branch B2 is an instruction bundle C+1 (i.e., the bundle which sequentially follows bundle C). Bundle C takes the form m2-nop-nop, or an MII template with two nops. Bundle C+1 takes the form nop-i1-nop, which also coincides with an MII template with two nops. If a thread is suspended on syllable 0 of an original M,MI bundle prior to a dynamic patch, the thread will resume with syllable 0 of the patch bundle, execute instruction m1 in the patch bundle, branch to patch code, execute instruction m2 in a patch code bundle C, and then execute instruction i1 in a patch code bundle C+1. If a thread is suspended on syllable 1 of an original M,MI bundle prior to a patch, the thread will resume with syllable 1 of the patch bundle, which branches to patch code bundle C to execute instruction m2 and then proceeds with the execution of instruction i1 in patch code bundle C+1. If a thread is suspended on syllable 2 of an original M,MI bundle prior to a patch, the thread will resume with syllable 2 in the patch bundle, which branches to patch code bundle C+1 to execute instrucion i1.

3. Patching a Bundle With a Long IP-Relative Branch Instruction

Figures 17, 18:
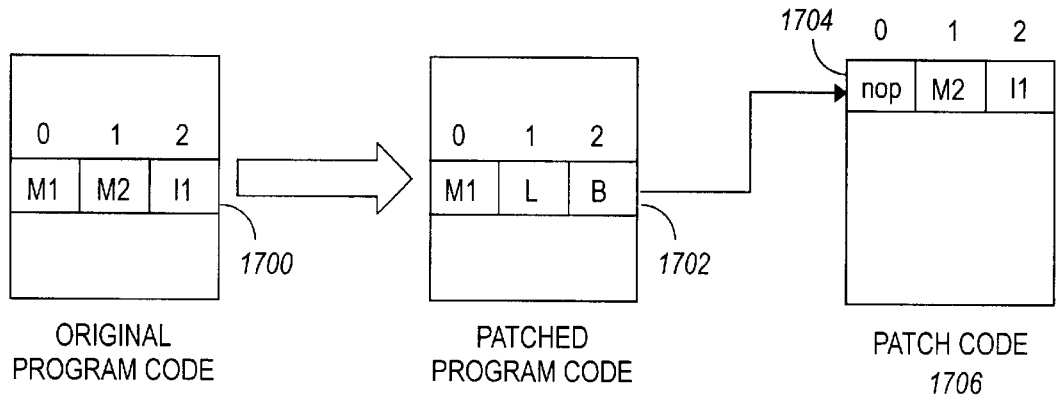
FIG. 17 illustrates a thread-safe bundle patching technique which uses long IP-relative branch instructions to statically or dynamically patch program code.
FIG. 18 illustrates how various IA-64 instruction templates may be patched using a long IP-relative branch instruction.

FIG. 17 illustrates a thread safe IA-64 bundle patch using a long IP-relative branch. The original MMI instruction bundle 1700 is split into two bundles 1702, 1704. The syllable_1 M2 instruction and the syllable_2 I1 instruction are copied to a patch code bundle 1704 in a code cache 1706 (i.e., patch code), while the syllable_0 M1 instruction remains in the patched bundle 1702 along with a long IP-relative branch instruction. Note that the long branch instruction occupies syllables_1 and_2 of the patched bundle 1702. When a suspended thread resumes from syllable_1 of the patched bundle 1702, it executes a direct branch to the code cache 1706, thereby skipping instruction M1 and executing only the M2 and l1 instructions of the patch code bundle 1704.

Note that if a thread is suspended on syllable_2 of a bundle 1700 to be patched, when it resumes from syllable_2 of the MLB patch bundle 1702, it will trigger an illegal operation fault. As discussed previously, to support pseudoatomic bundle write, a master signal handler and illegal operation fault handler need to be installed. The fault handler can also check whether a fault is caused by a return from interrupt (RFI) to syllable_2 of an MLB patch bundle 1702. In this case, the handler can compute the target address of the long branch, RFI to the appropriate patch code bundle 1704, and then resume instruction execution from syllable_2 of that bundle 1704. Details of patching with long branch instructions and the MLB template are provided in FIG. 18.

The patching of the BBB template is somewhat unique. If a thread is suspended on syllable_1 or syllable_2 during a patch of this template, execution may resume and reexecute branches in earlier slots. However, since the branches in these earlier slots are fall-through, and fall-through branches have no side-effects, re-executing them is acceptable. If this is deemed unacceptable, a run-time optimizer can choose not to patch such templates. Alternatively, a trace selector can avoid selecting a trace starting with a BBB template.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A processor, comprising:
    a) a register file having a plurality of registers;
    b) an instruction set including instructions which address the registers, the instructions being encoded in bundles, with each bundle including a plurality of instructions grouped together in an X bit field, the instructions being located in instruction syllables of the X bit field, each instruction being one of a plurality of instruction types including integer, memory, floating-point and branch, wherein the branch instructions comprise:
        i) a single-syllable IP-relative branch instruction which carries M offset bits; and
        ii) a long IP-relative branch instruction which occupies multiple syllables of an instruction bundle, wherein a first syllable carries N offset bits and a second syllable carries P offset bits;
    c) a plurality of execution units, each execution unit being one of a plurality of types, wherein each instruction type is executed on one or more execution unit types, and wherein the plurality of execution units comprise:
        i) a first branch execution unit, the first branch execution unit comprising an adder for:
            A) when the first branch execution unit is configured in a first mode, calculating a branch target by adding an instruction pointer value to an addend formed at least in part from the M offset bits carried by a single-syllable IP-relative branch instruction located in a first syllable of an instruction bundle; and
            B) when the first branch execution unit is configured in a second mode, calculating a branch target by adding an instruction pointer value to an addend formed at least in part from the N and P offset bits carried by a long IP-relative branch instruction located in first syllable and second syllables of an instruction bundle; and
        ii) a second branch execution unit, placed physically adjacent to the first branch execution unit, for calculating a branch target by adding an instruction pointer value to an addend formed at least in part from the M offset bits carried by a single-syllable IP-relative branch instruction located in a second syllable of an instruction bundle;
    d) first wires for routing bits in the first syllable of the instruction bundle to the first branch execution unit;
    e) second wires for routing bits in the second syllable of the instruction bundle to the second branch execution unit, wherein the second wires pass over the first branch execution unit; and
    f) means for coupling the second wires to the first branch execution unit.

2. A processor as in claim 1, wherein, when the first branch execution unit is configured in the second mode, the N and P offset bits carried by a long IP-relative branch instruction are merged to form part of said addend which is added to an instruction pointer value.

3. A processor as in claim 1, further comprising a multiplexer, the multiplexer comprising:
    a) first data inputs coupled to receive a number of sign extension bits; and
    b) second data inputs coupled to receive the P offset bits of a long IP-relative branch instruction;
        wherein, when the first branch execution unit is configured in the first mode, the multiplexer outputs the number of sign extension bits which are received at its first data inputs, and said number of sign extension bits are merged with the M offset bits of a single-syllable IP-relative branch instruction to form at least part of said addend which is added to an instruction pointer value; and
        wherein, when the first branch execution unit is configured in the second mode, the multiplexer outputs the P offset bits of a long IP-relative branch instruction which are received at its second data inputs, and said P offset bits are merged with the N offset bits of the same long IP-relative branch instruction to form at least part of said addend which is added to an instruction pointer value.

4. A processor as in claim 3, wherein the means for coupling the second wires to the first branch execution unit comprises means for coupling the second wires to the second data inputs of the multiplexer.

5. A processor as in claim 1, wherein a merger of the N and P offset bits of a long IP-relative branch instruction provide an offset which, when added to an instruction pointer value, is capable of redirecting an instruction pointer to an address of any instruction bundle stored in the processor's address space.

6. A processor as in claim 1, wherein X=128 and an instruction bundle consists of three instruction syllables.

7. A processor as in claim 6, wherein each instruction bundle further comprises a template field, wherein one state of the template field maps a first syllable of an instruction bundle to a memory execution unit, and maps second and third syllables of an instruction bundle to the first branch execution unit.

8. A processor as in claim 1, wherein M=N.

9. A processor as in claim 1, further comprising a cache for storing at least portions of said calculated branch targets.

10. A method of increasing branch reach in a processor which fetches instructions in bundle form, the method comprising:
    a) determining which of a number of instruction bundle templates corresponds to the fetched instruction bundle;
    b) if the fetched instruction bundle corresponds to an instruction bundle template which indicates that the fetched instruction bundle holds a single-syllable IP-relative branch instruction carrying M offset bits, then calculating a target of the single-syllable IP-relative branch instruction by adding an instruction pointer value to an addend formed at-least in part from said M offset bits;

c) if the fetched instruction bundle corresponds to an instruction bundle template which indicates that multiple syllables of the fetched instruction bundle hold a long IP-relative branch instruction, wherein a first syllable of the long IP-relative branch instruction carries N offset bits, and a second syllable of the long IP-relative branch instruction carries P offset bits, then calculating a target of the long IP-relative branch instruction by adding an instruction pointer value to an addend formed at least in part from said N and P offset bits;

d) if a single-syllable IP-relative branch instruction is held in a syllable of an instruction bundle which is also capable of holding the first syllable of a long IP-relative branch instruction, then performing said target calculations for each of said branch instructions using an adder of a first branch execution unit;

e) placing the first branch execution unit in close proximity to a second branch execution unit, and routing over said first branch execution unit, bits of any instruction syllables which need to be provided to said second branch execution unit;

f) if a single-syllable IP-relative branch instruction is held in a syllable of an instruction bundle which is also capable of holding the second syllable of a long IP-relative branch instruction, then performing said target calculation for said single-syllable IP-relative branch instruction using an adder of the second branch execution unit; and g) diverting program flow control to an instruction bundle which is addressed by the target.

11. A method as in claim 10, comprising, forming said addends by:

a) when a target of a long IP-relative branch instruction is being calculated, filling a first number of bit positions of an addend input of said first branch execution unit adder with the N offset bits carried by the long IP-relative branch instruction, and filling a second number of bit positions of the addend input of said adder with the P offset bits carried by the long IP-relative branch instruction; and b) when a target of a single-syllable IP-relative branch instruction is being calculated, filling the first number of bit positions of the addend input of said first branch execution unit adder with the M offset bits carried by the single-syllable IP-relative branch instruction, and filling the second number of bit positions of the addend input of said adder with a number of sign extension bits.

12. A method as in claim 10, further comprising storing at least portions of said calculated targets in a cache.

13. A method as in claim 12, wherein said cache in which calculated targets are stored is integrated with a low level instruction cache, the method further comprising, fetching long IP-relative branch instructions and their associated targets from said integrated caches when the long IP-relative branches are to be executed a second or additional time.

* * * * *